(12) United States Patent
Volpato et al.

(10) Patent No.: US 11,904,504 B2
(45) Date of Patent: Feb. 20, 2024

(54) HIGH-PRESSURE MIXING DEVICE WITH SENSORED SELF-CLEANING DELIVERY DUCT

(71) Applicant: AFROS S.P.A., Milan (IT)

(72) Inventors: Marco Volpato, Milan (IT); Maurizio Corti, Milan (IT); Fabio Fini, Milan (IT); Luca Campi, Milan (IT); Samuele Zampini, Milan (IT)

(73) Assignee: AFROS S.P.A

( * ) Notice: Subject to any disclaimer, the term of this patent is extended or adjusted under 35 U.S.C. 154(b) by 957 days.

(21) Appl. No.: 16/828,513

(22) Filed: Mar. 24, 2020

(65) Prior Publication Data
US 2020/0307024 A1 Oct. 1, 2020

(30) Foreign Application Priority Data
Mar. 27, 2019 (IT) .................. 102019000004609

(51) Int. Cl.
*B29B 7/74* (2006.01)
*B29B 7/76* (2006.01)
(Continued)

(52) U.S. Cl.
CPC .......... *B29B 7/7404* (2013.01); *B29B 7/7615* (2013.01); *B29B 7/7657* (2013.01);
(Continued)

(58) Field of Classification Search
CPC ..... B29B 7/488; B29B 7/7684; B29B 7/7689; B29B 7/7694; B29B 7/80; B29B 7/7631;
(Continued)

(56) References Cited

U.S. PATENT DOCUMENTS 3,706,515 A * 12/1972 Keuerleber ........... B29B 7/7673
264/DIG. 83
3,799,199 A * 3/1974 Rumpff ................. B29B 7/7694
264/DIG. 83
(Continued)

FOREIGN PATENT DOCUMENTS

DE 2065819 A1 6/1976
DE 4214404 A1 11/1993
(Continued)

*Primary Examiner* — Charles Cooley
(74) *Attorney, Agent, or Firm* — LAUBSCHER & FRETWELL, P.C.

(57) ABSTRACT

A device for mixing at high-pressure two or more reactive liquid components or resins includes a head-body provided with a mixing chamber with inlet and outlet openings for the injecting and recirculating reactive components; a single-piece tubular element, for delivering the mixture; a valve member with longitudinal recirculation slots; the tubular element is removably inserted into a pass-through hole of the head-body, having annular shoulder zone, separated and distant from the transversal hole; fixing elements removably lock the annular shoulder zone at the head-body for holding the tubular element in the aforesaid hole; a clearance gap between the tubular element and the pass-through hole of the head-body is provided such that the forces are exchanged through the annular shoulder zone; sealing and centering elements avoid leakages of polymeric mixture. Deformation-detecting elements detect the deformation conditions which the tubular element is subjected.

34 Claims, 20 Drawing Sheets

(51) Int. Cl.
  *B29B 7/80* (2006.01)
  *B29C 44/36* (2006.01)

(52) U.S. Cl.
  CPC .......... *B29B 7/7668* (2013.01); *B29B 7/7684* (2013.01); *B29B 7/801* (2013.01); *B29C 44/365* (2013.01)

(58) Field of Classification Search
  CPC ........ F16J 15/0887; F16J 15/46; F16J 15/545; B01F 2035/351; B01F 35/00; B29C 43/52; B29C 2043/028; B29C 43/36; B29C 43/027; B29K 2027/16; B29K 2027/18; B29L 2031/26; B29L 2031/265
  USPC ......... 366/162.4, 162.5, 167.1, 173.1, 159.1; 422/131, 133–135
  See application file for complete search history.

(56) References Cited

U.S. PATENT DOCUMENTS

| | | | | |
|---|---|---|---|---|
| 4,082,512 A * | 4/1978 | Wingard | ............... | B29B 7/7689 422/240 |
| 4,099,919 A * | 7/1978 | Leidal | ................... | B29B 7/7615 366/173.1 |
| 4,108,606 A * | 8/1978 | Wingard | ............... | B29B 7/7471 521/917 |
| 4,279,517 A * | 7/1981 | Wallner | ................ | B29B 7/7689 366/159.1 |
| 4,442,070 A | 4/1984 | Proksa et al. | | |
| 4,778,659 A * | 10/1988 | Inoue | ....................... | B29B 7/42 264/DIG. 83 |
| 5,082,633 A * | 1/1992 | Stuper | ................... | B29B 7/7694 422/135 |
| 5,261,741 A | 11/1993 | Hladis | | |
| 5,785,422 A * | 7/1998 | Eidenmuller | ......... | B29B 7/7668 422/133 |
| 9,308,512 B2 * | 4/2016 | Fiorentini | ............. | B29C 67/246 |
| 11,559,920 B2 * | 1/2023 | Volpato | ................ | F16J 15/0887 |
| 2020/0307024 A1 * | 10/2020 | Volpato | ................... | B29B 7/728 |
| 2020/0307025 A1 * | 10/2020 | Volpato | ................. | B29B 7/7694 |

FOREIGN PATENT DOCUMENTS

| | | |
|---|---|---|
| EP | 2767376 A1 | 8/2014 |
| GB | 2488125 A | 8/2012 |
| KR | 20140116726 A | 10/2014 |
| WO | WO-2007082606 A1 * 7/2007 ........... B29B 7/7663 |

* cited by examiner

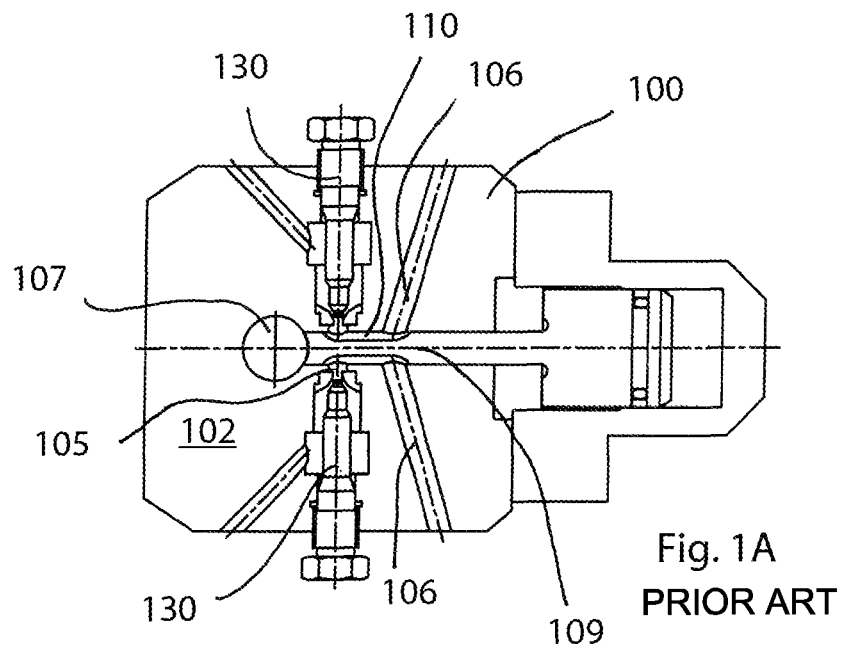
Fig. 1A
PRIOR ART
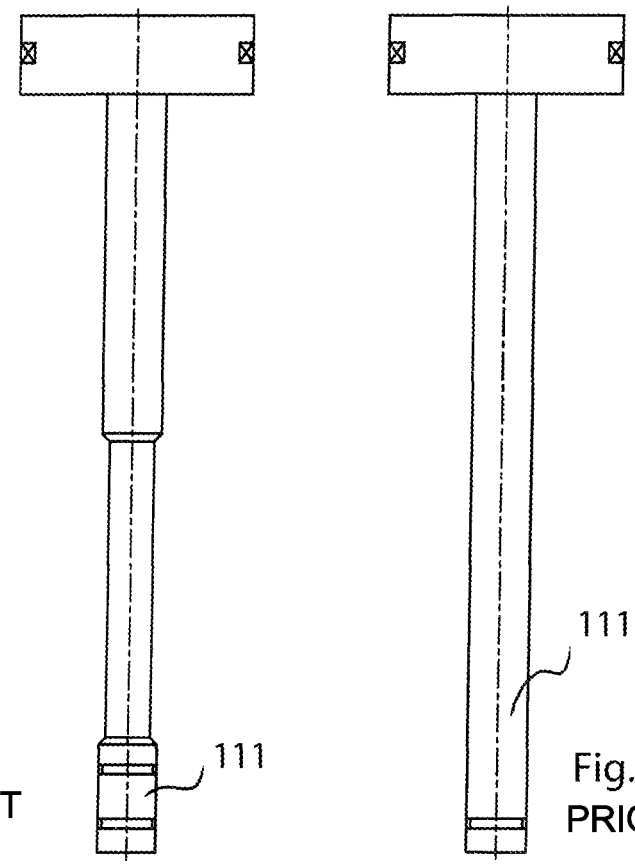
Fig. 3
PRIOR ART
Fig. 2
PRIOR ART

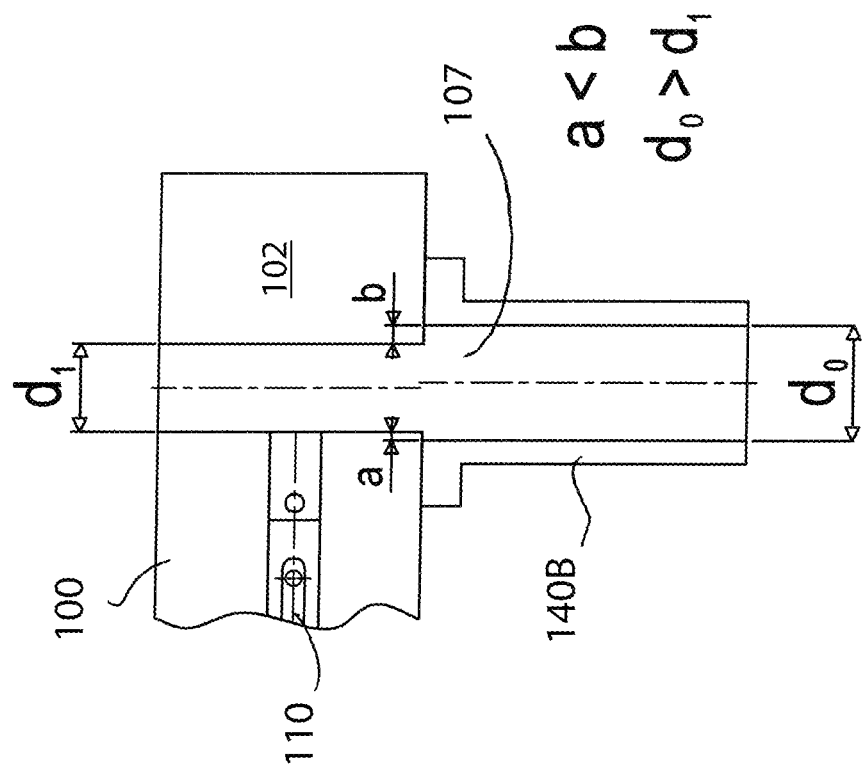
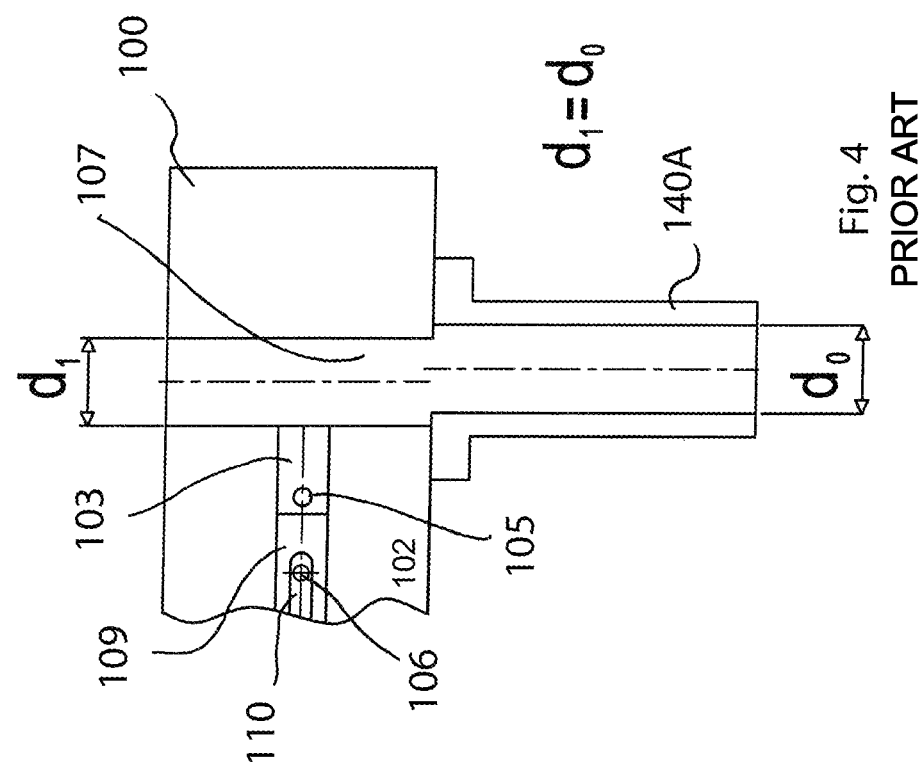
Fig. 4
PRIOR ART
Fig. 5
PRIOR ART

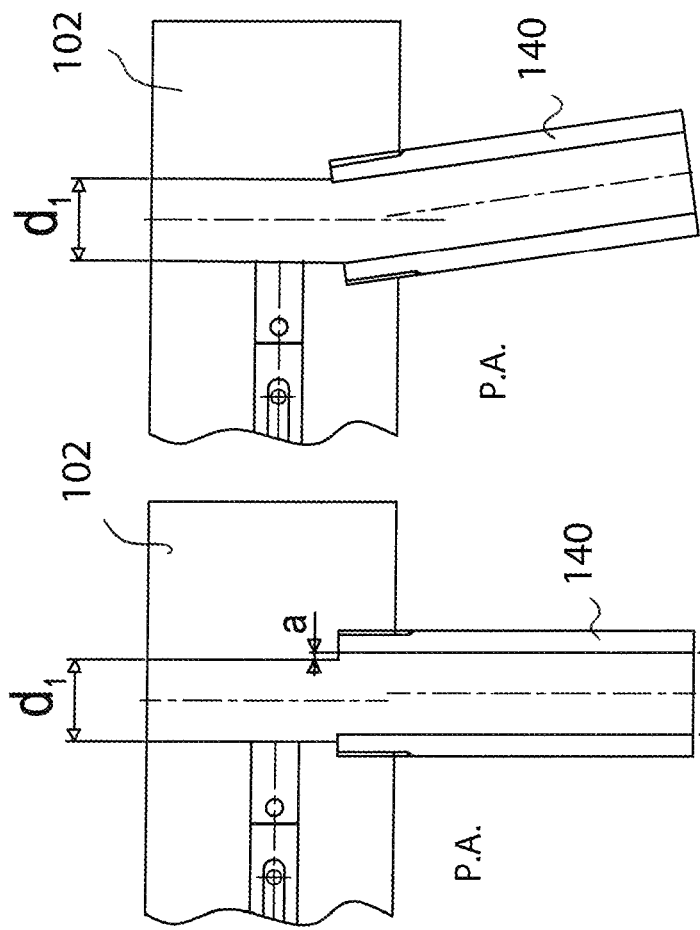
Fig. 4A PRIOR ART
Fig. 4B PRIOR ART
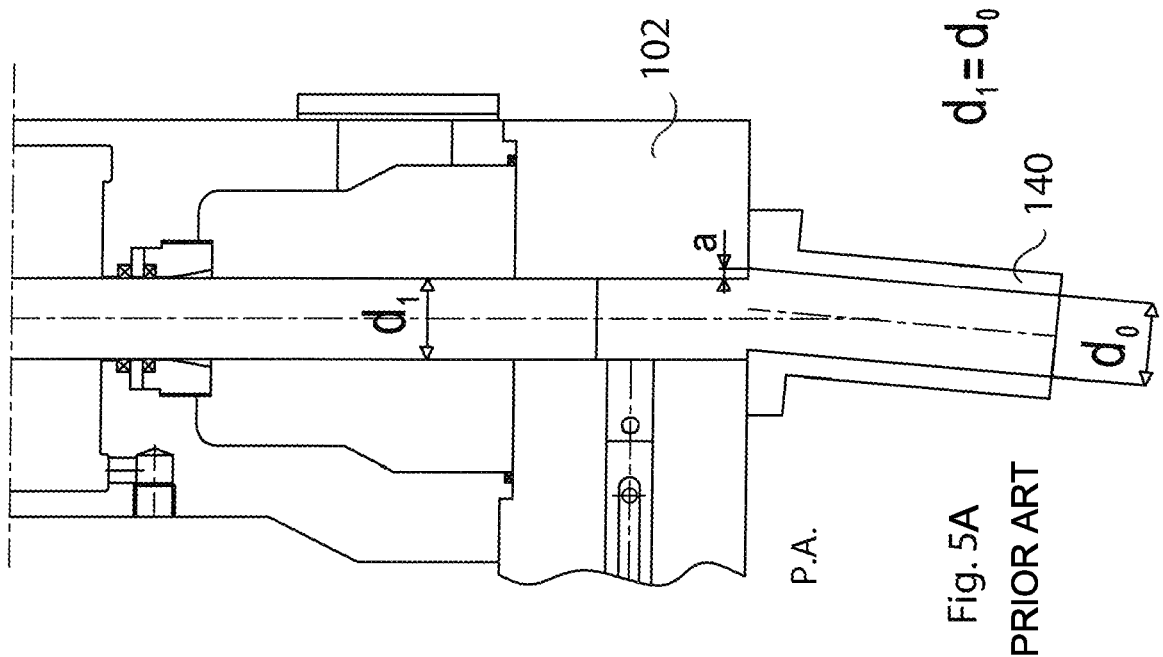
Fig. 5A PRIOR ART

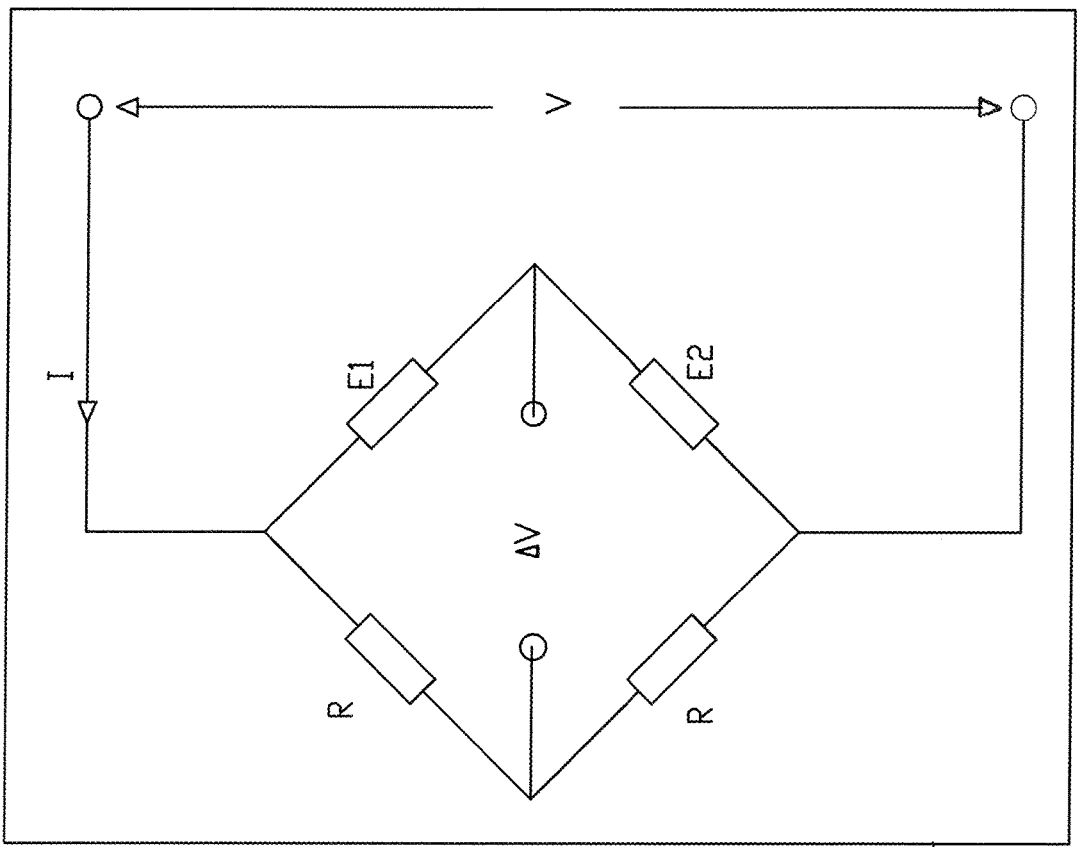
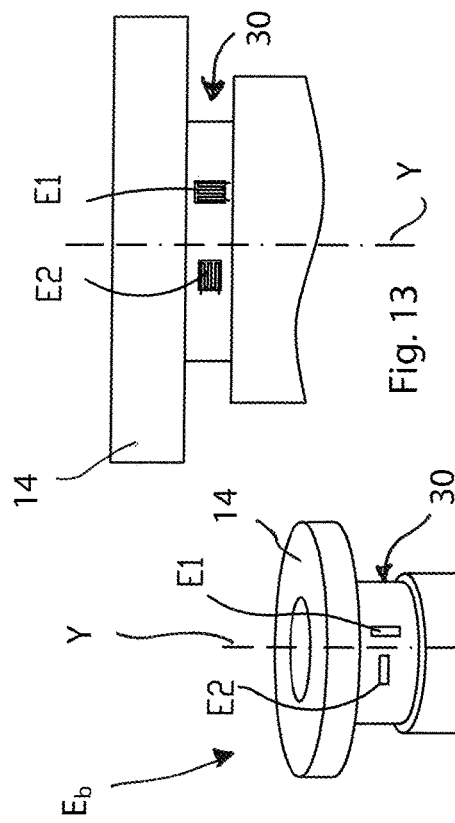
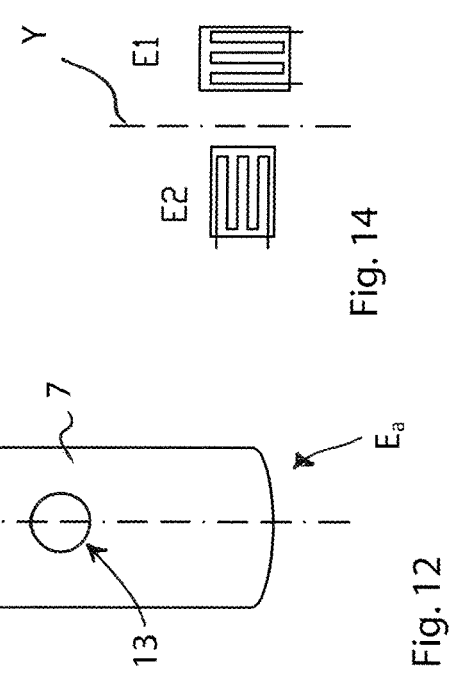

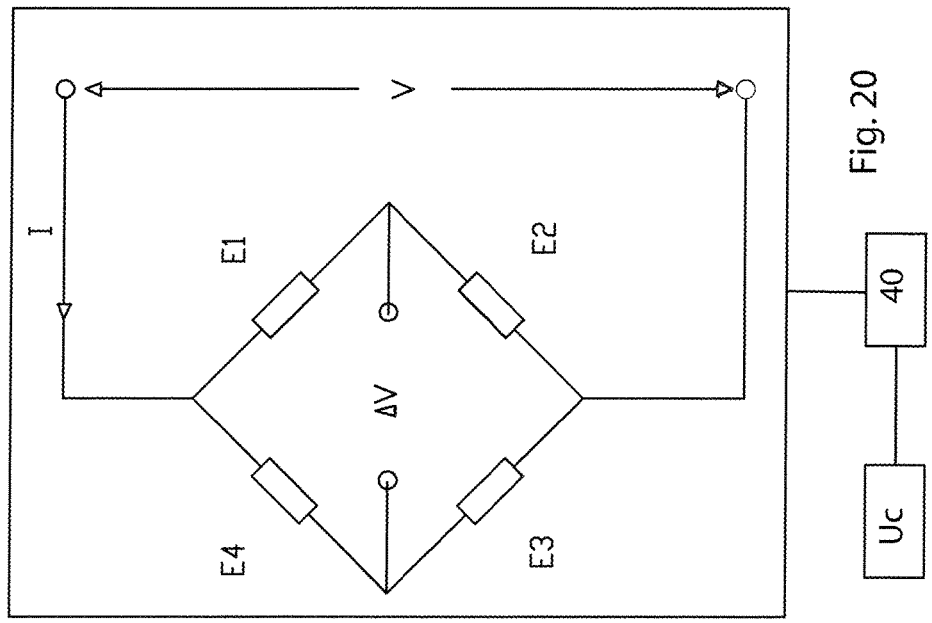
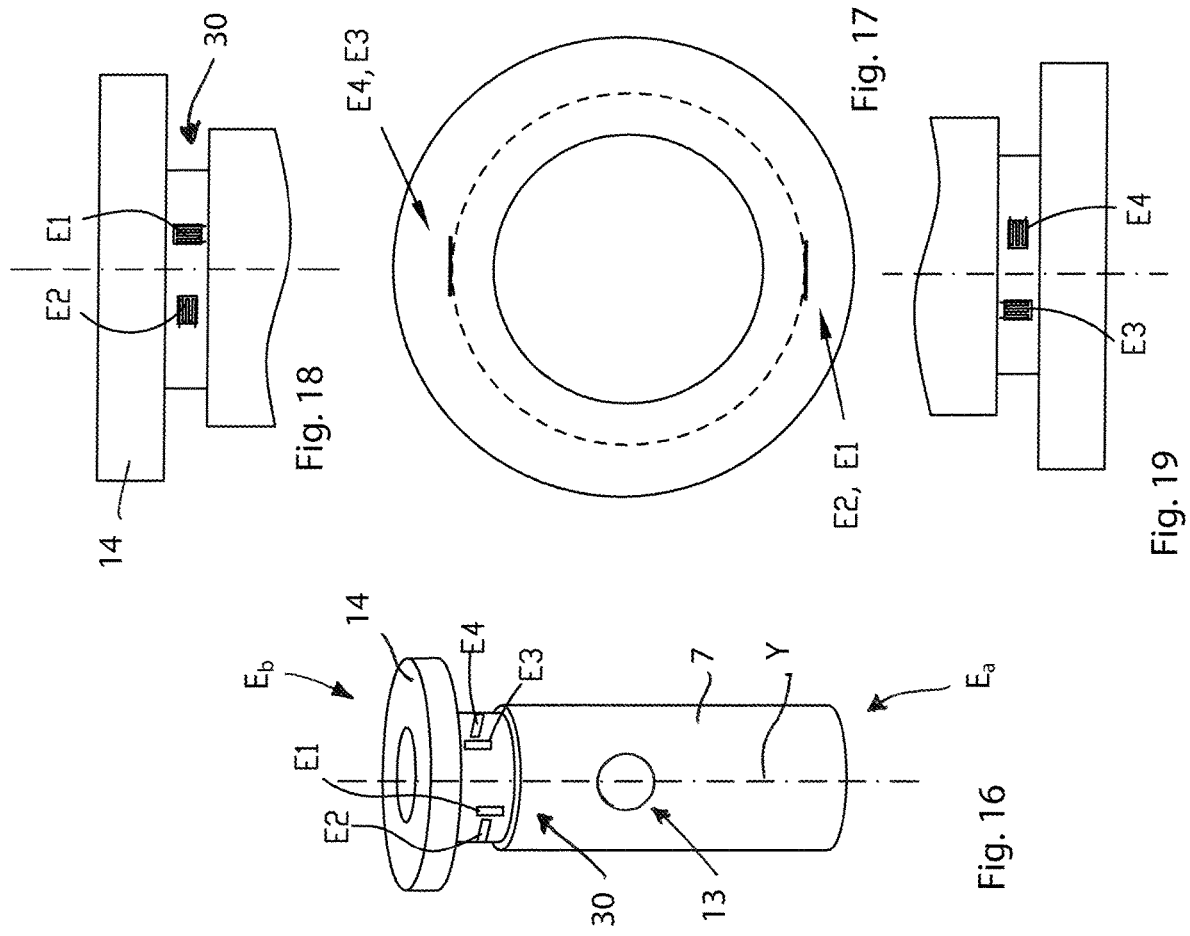

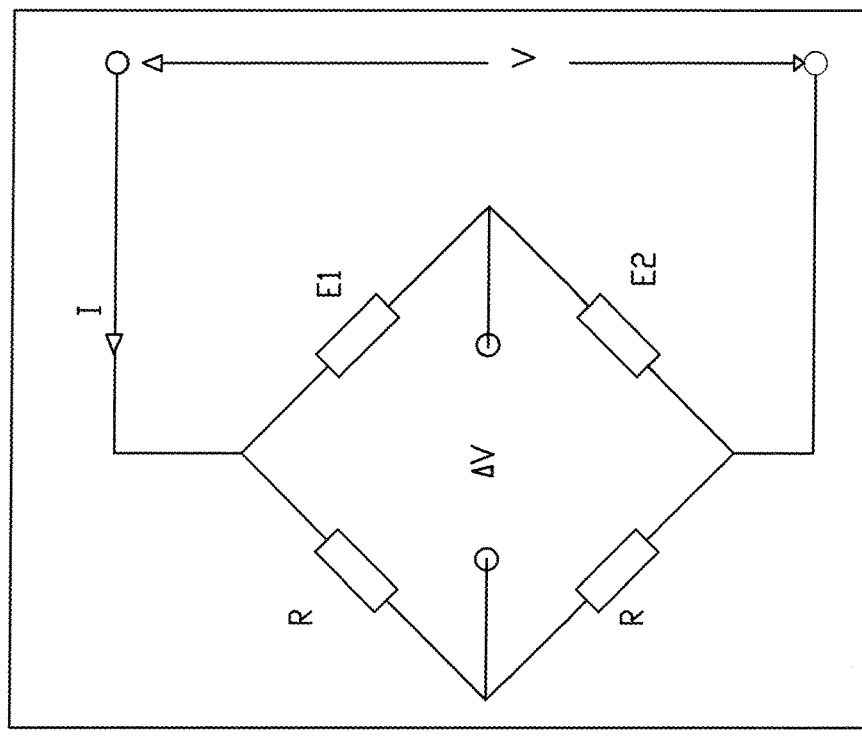
Fig. 24
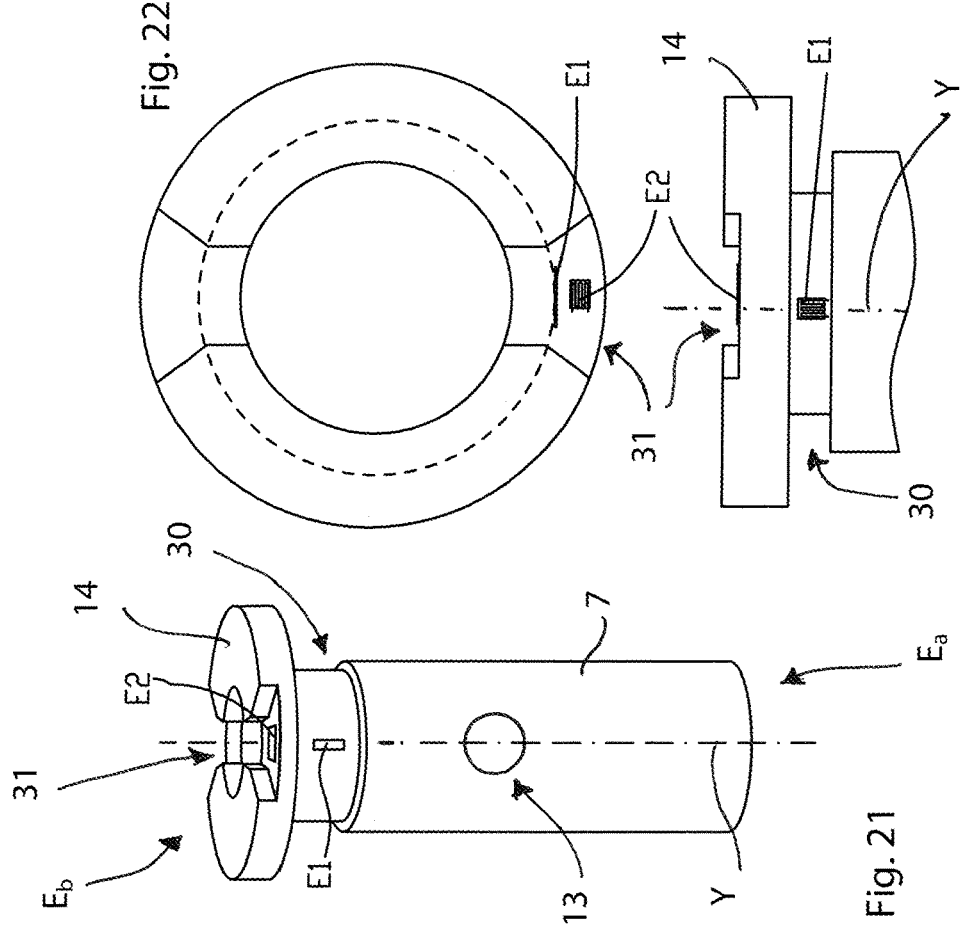
Fig. 22
Fig. 23
Fig. 21

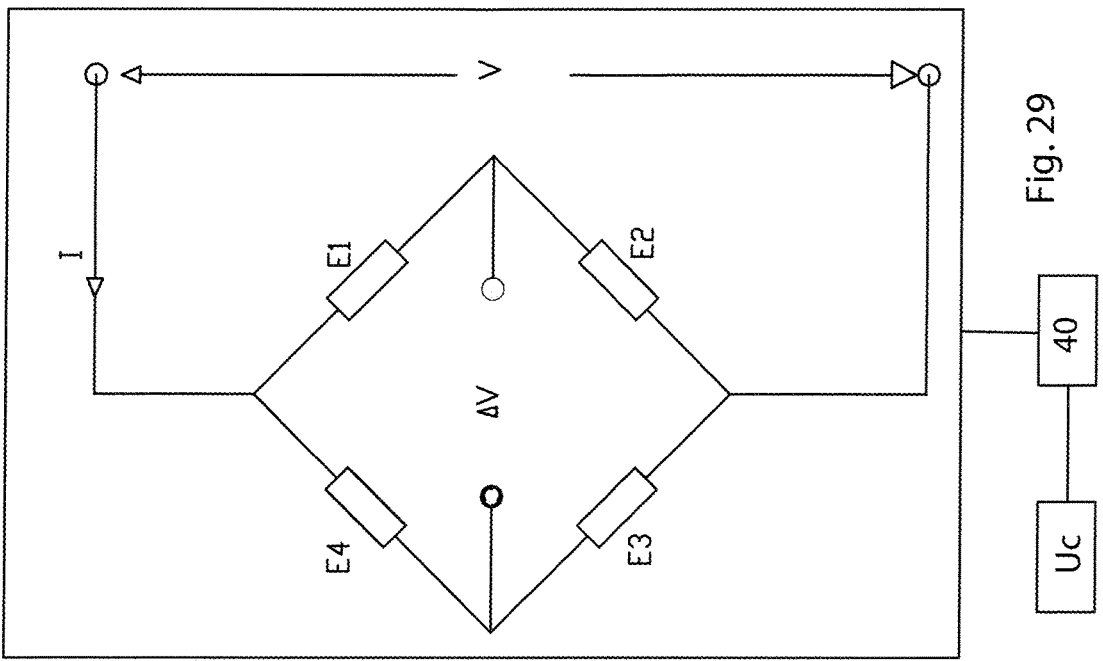
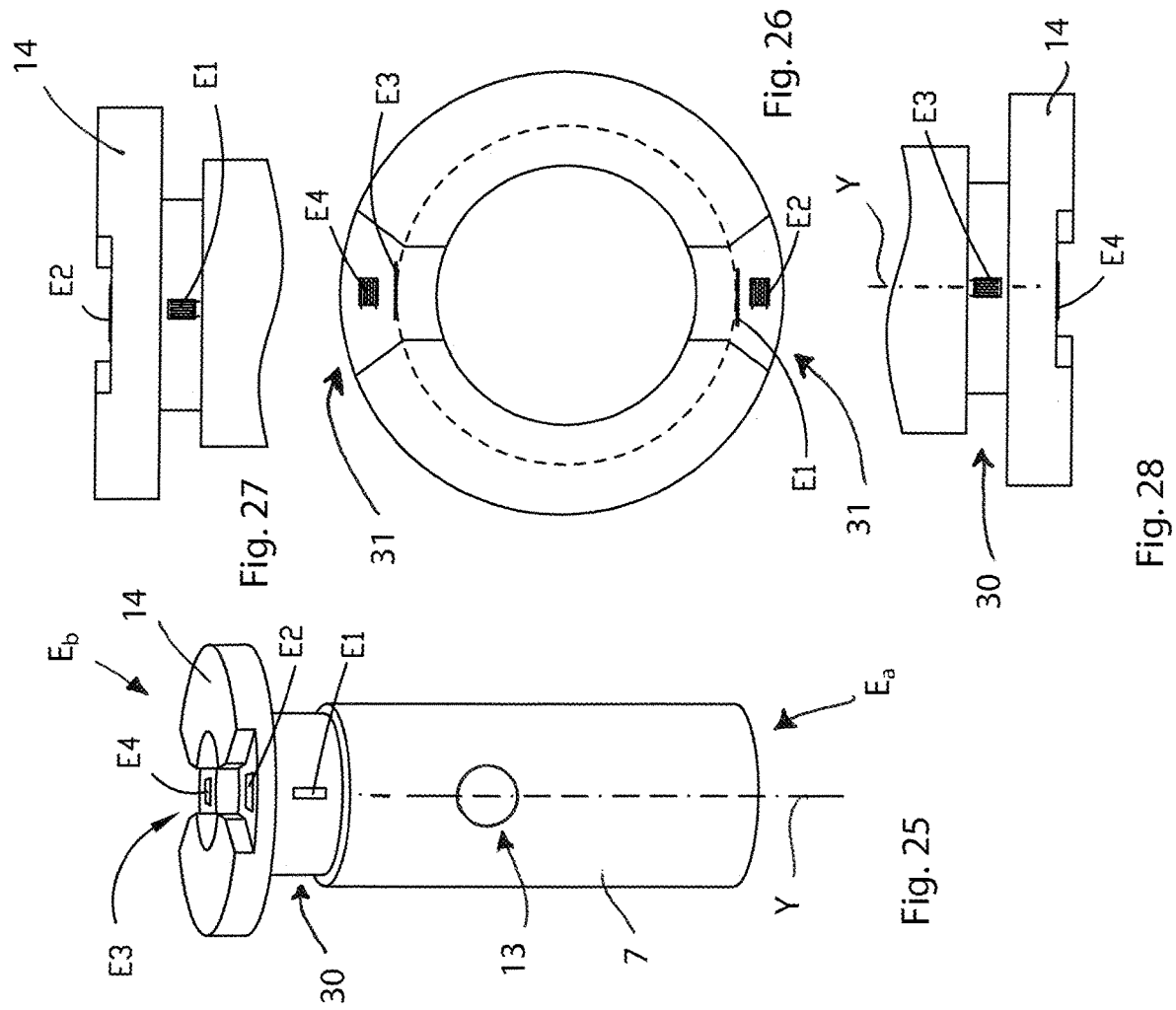
Fig. 25, Fig. 26, Fig. 27, Fig. 28, Fig. 29

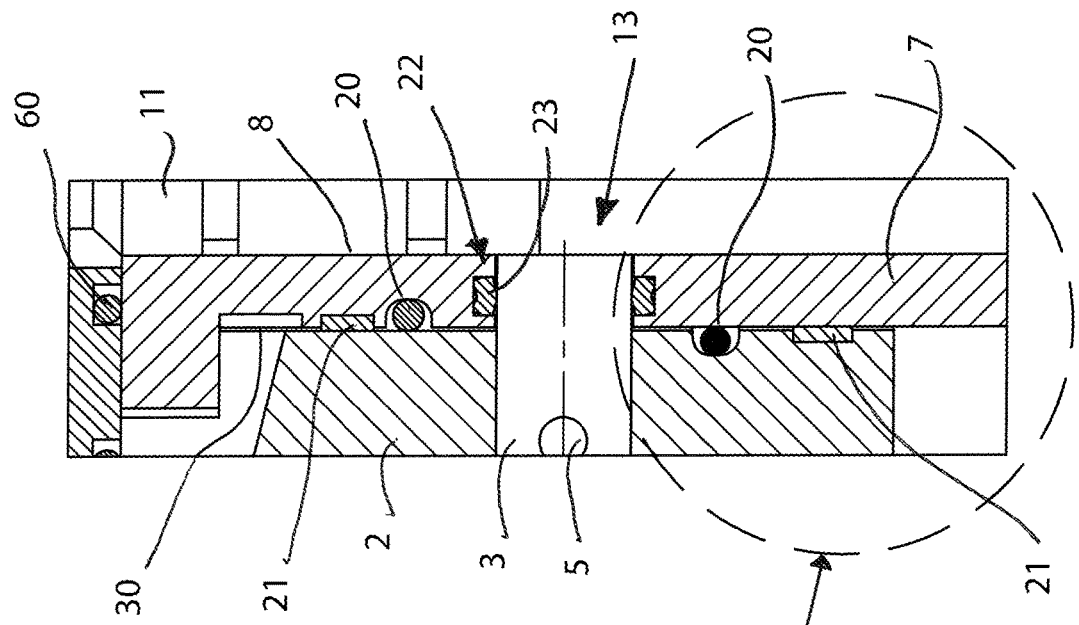
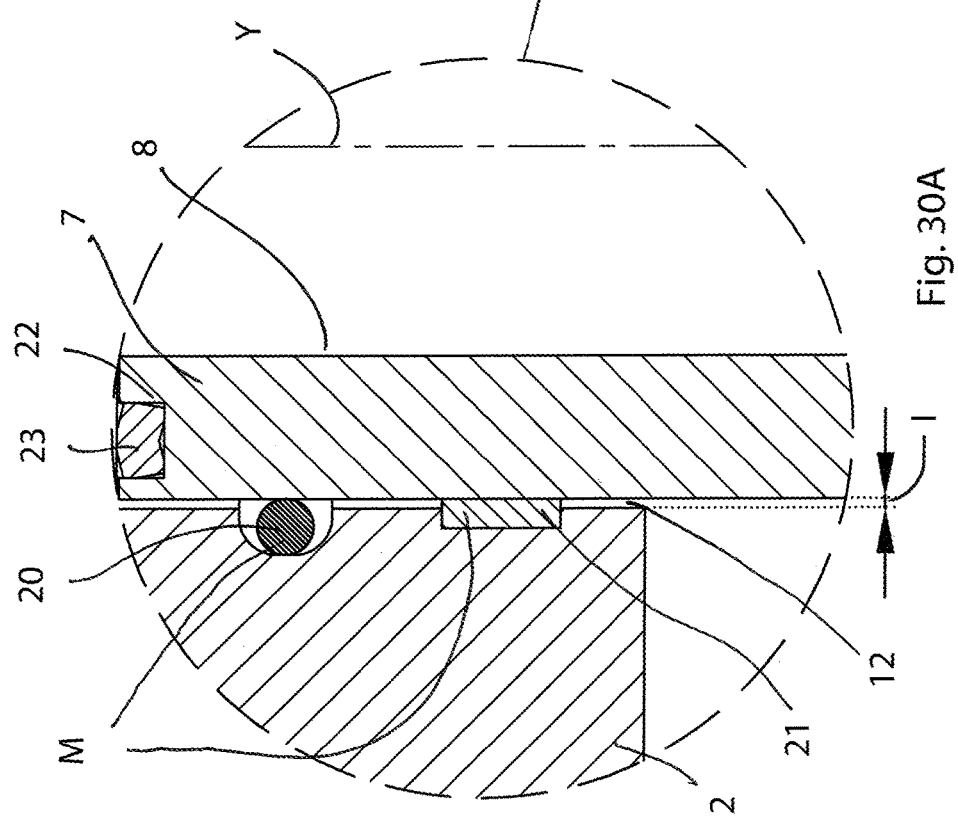
Fig. 30
Fig. 30A

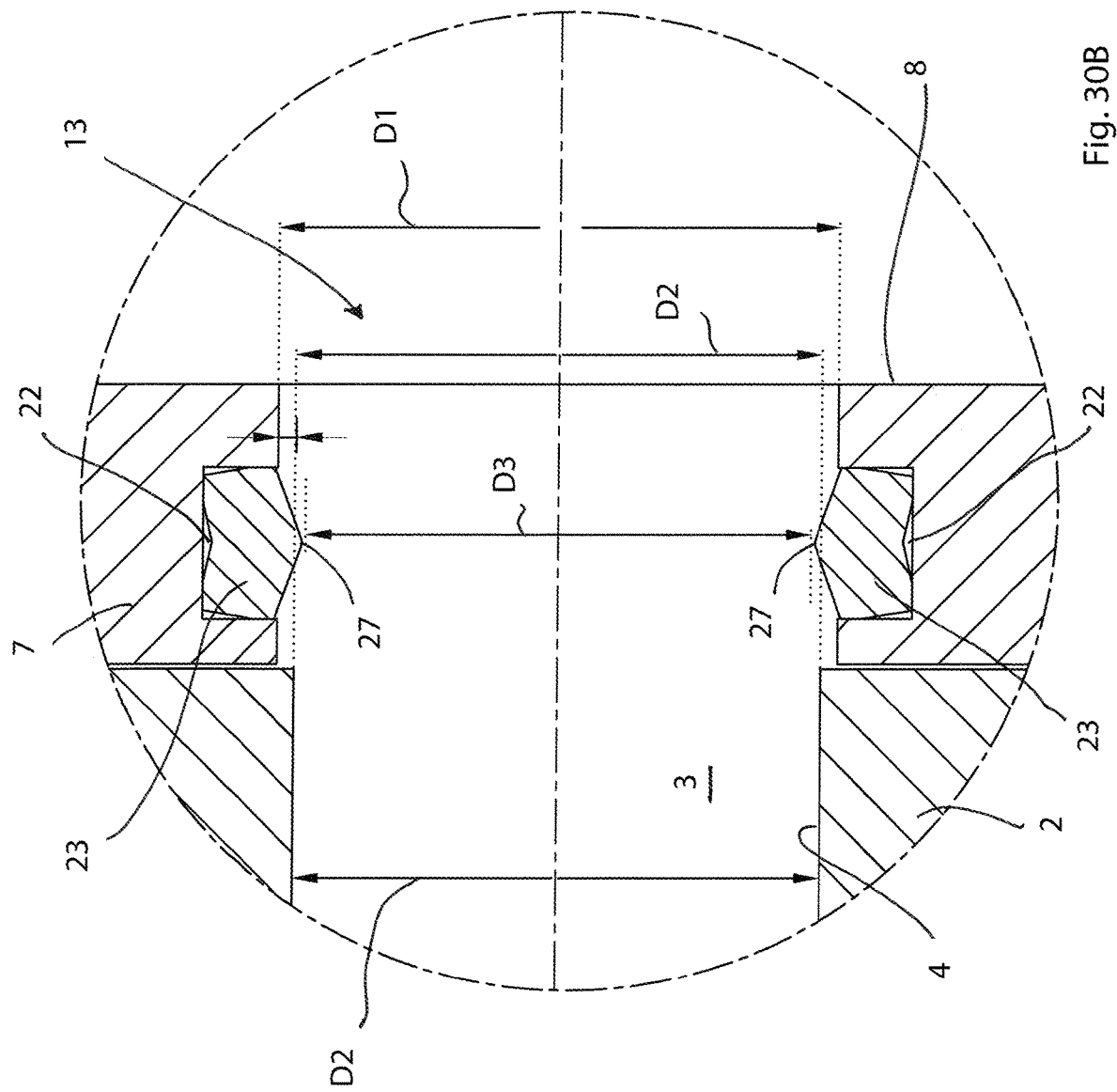

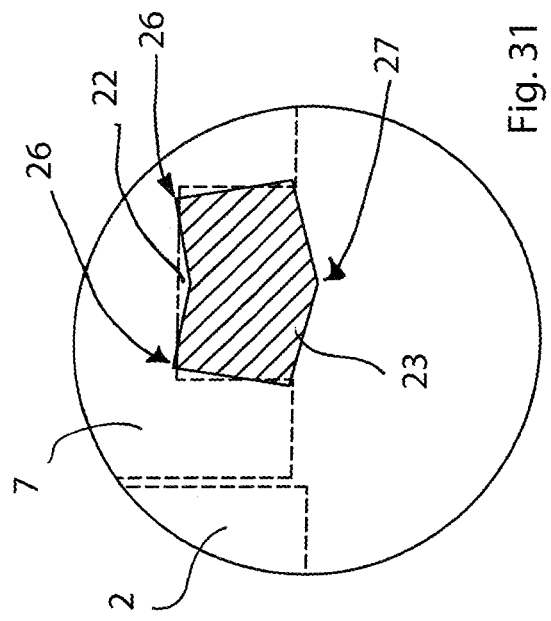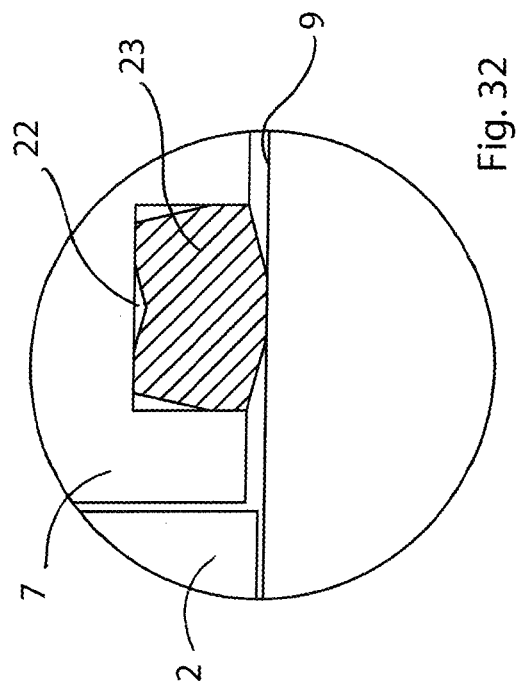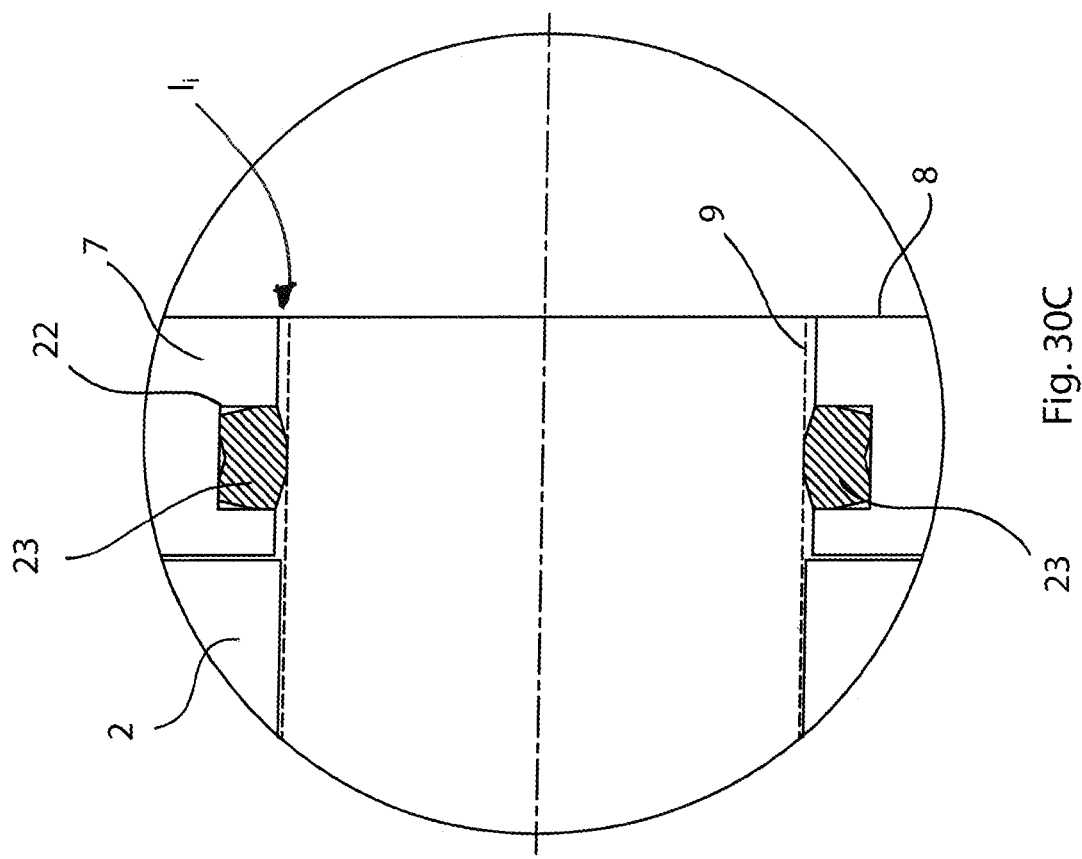

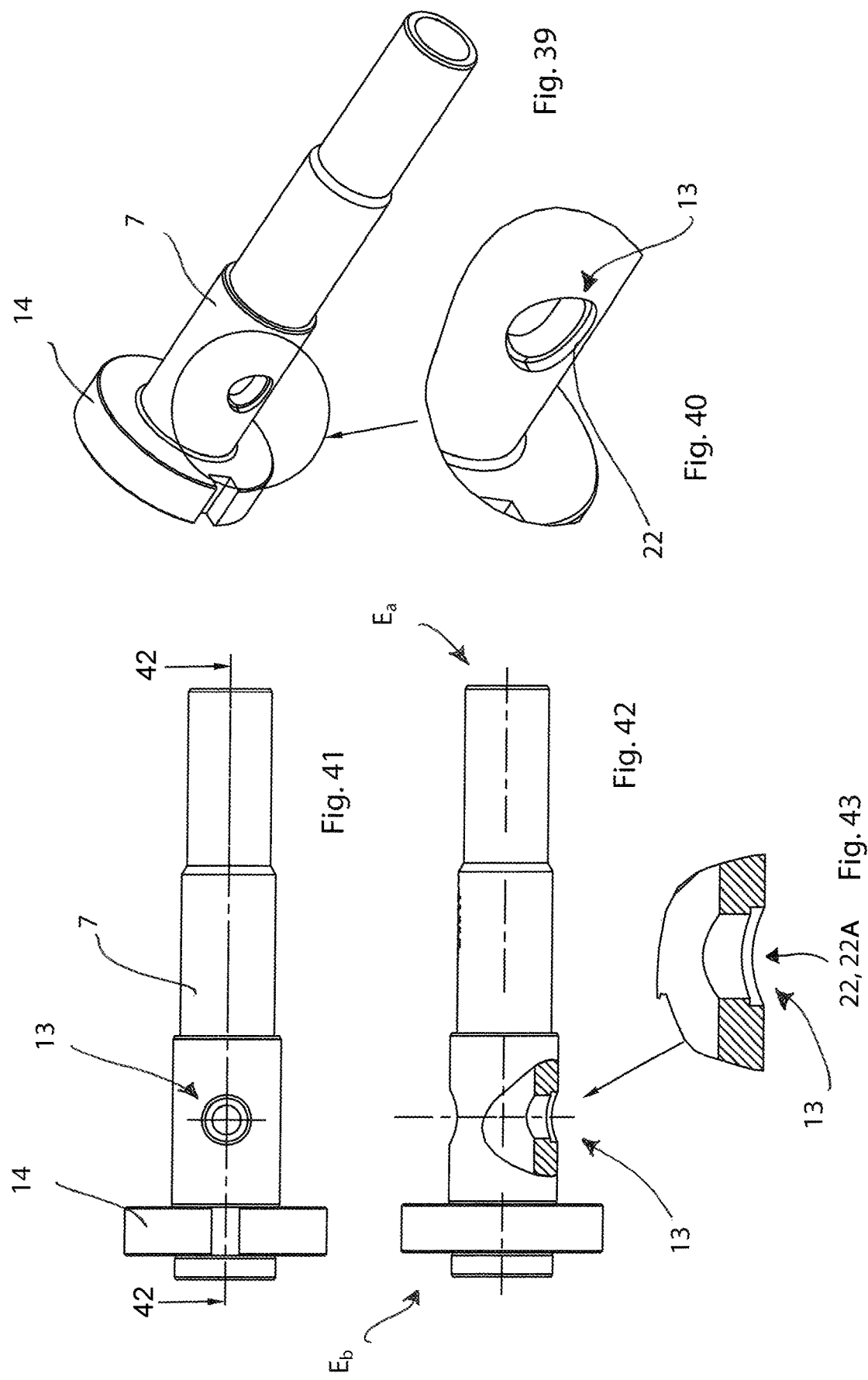

HIGH-PRESSURE MIXING DEVICE WITH SENSORED SELF-CLEANING DELIVERY DUCT

CROSS-REFERENCE TO RELATED APPLICATION

This application claims priority of Italian Patent Application No. 102019000004609 filed Mar. 27, 2019. The entire content of this application is incorporated herein by reference.

BACKGROUND OF THE INVENTION

The present invention relates to a device for mixing at a high-pressure liquid polymeric components or reactive resins for forming a reacting polymeric mixture intended to be poured or injected to produce various objects. The mixing device according to the invention is able to process a polyurethane, epoxy, vinyl ester, polyester, silicon and phenolic resin.

STATE OF THE ART

They are known in the art mixing devices, in particular high-pressure self-cleaning L-shaped mixing heads, adapted to mix polymeric components such as to obtain reacting chemical mixtures of reactive resins intended to be injected or delivered into a mould. The chemical mixtures originate from the impingement of at least two jets inside a circular-section cylindrical chamber referred to as mixing chamber.

In FIG. 1 it is shown a known "L-shaped" self-cleaning mixing head, some parts of which are shown in FIGS. 1A, 2, 3, 4 and 5.

Before being sent into the mixing chamber 103, polymeric components are dosed at a stoichiometric ratio and at high-pressure by means of volumetric dosers, performing a monitoring in a closed loop by means of suitable flow rate transducers.

The polymeric components, duly dosed, reach the mixing head where suitable injectors 130, transforming the pressure energy into kinetic energy of the jets, inject them into the mixing chamber 103 where the mixing occurs by impingement of respective jets and as a result of the induced high turbulence.

The reacting mixture originated from mixing the jets subsequently flows towards a cylinder-shaped delivery duct 107, placed orthogonally with respect to the mixing chamber 103, that deviates the mixture flow and reduces the turbulence thereof until the final outlet mouth.

The term "L-shaped head" is generally used to indicate this specific type of heads whose configuration is determined by the mutual space arrangement of the two ducts, i.e. the mixing chamber 103 and the delivery chamber or delivery duct 107 which are arranged orthogonally with respect to one another.

In each of the aforementioned chambers there are slidingly movable elements suitable for scraping and ejecting the reacting resin (valve member or mixing slide valve 109, and cleaning member or stem 111 respectively, shown in FIGS. 2, 3, described in the following), whose respective movements must occur in sequence both for the delivery and the subsequent ejection of the end volume of reacting resins.

In the mixing chamber 103, having circular section, they are faced two or more injection holes 105 (associated with respective injectors 130), placed nearer to the front zone, i.e. towards the outflow part into the delivery duct 107, and through which the jets of reactive resins are supplied, and two or more respective recirculation holes 106 placed at the back and longitudinally in axis with the aforesaid injection holes 105 placed further onwards, and whose function is to allow recirculation of reactive resins towards the respective storage tanks.

Inside the mixing chamber 103 the aforesaid valve member, or mixing slide valve 109, is slidingly movable, provided with longitudinal slots 110 for the separate recirculation of the resins and, advancing, also performs the cleaning of the mixing chamber 103 ejecting the residues of mixed resins.

The valve member 109, hydraulically controlled by means of a cylinder, is reciprocal between an opening and mixing backward position, and a closure and recirculation advanced position.

When the valve member 109 is taken to the closure advanced position, its recirculation slots 110 are faced on the injectors 130 and convey the flows of the respective resins backward towards corresponding recirculation holes 106 made in the body 102 of the head, where, through specific ducts, resins flow back towards the respective tanks from which they were taken and dosed under pressure.

In the backward or opening position, the injection holes 105 are exposed, and the resin jets flow into the mixing chamber where they can collide between them or against the walls of the chamber to mix among them by strong turbulence in few milliseconds.

The valve member 109, therefore, acts as an hydraulic member which performs one first step of recirculating the reactive resins keeping them separated, by means of recirculation slots 110, one subsequent second step, when it is retracted to expose the injection holes, wherein jets are allowed to impact mutually and against the walls of the mixing chamber 103, creating a necessary turbulence condition so as to obtain a rapid and thorough mixing of the resins thereof, and one third step of interrupting the mixing, wherein the valve member 109 is again advanced to return the slots at the jets making the resins recirculate separately; at the same time, in the advancement movement, the valve member ejects the volume of mixed resins from the mixing chamber 103 towards the delivery duct 107, the latter being also referred to as "self-cleaning duct" due to the presence of the cleaning member or stem 111 mutually movable therein.

The slots 110 therefore perform recirculation and keep the reactive resins separated during the operating step in which they must not be mutually mixed but they must on the contrary be dosed under pressure and kept separated in order to allow to set the dosing parameters i.e. the correct ratio between the reactive components, the pressure reached by the injectors and the maintenance of the recirculation pumping thereof to stabilize the essential parameters of the process such as temperature, pressure, ratio and dispersion of possible charges or expansion agents.

The front section of the slide valve 109 is solid cylindrical and cavity-free and it is coupled with a clearance of few micrometres with the mixing chamber to act as a scraper and ejector in the closure advanced position, and not to allow resins flow out towards the self-cleaning duct 107 when the slide valve is closed to perform recirculation, as schematized in FIG. 1A.

Usually the movement of the slide valve 109 is very rapid and its solid front cylindrical part intercepts the jets of reactive components for a very short time while passing in front of the injectors while the slide valve is retracted to enable mixing; the injection holes are again "blinded" for a very short time when the slide valve advances to switch from the mixing position to the recirculation position.

During the recirculation step, the pumps that dose the reactive resins take the different flows to the flow-rate regime without mixing the reactive resins between them while injectors adjust pressure through hydraulic throttles normally made on the nozzles outlet holes.

Thereby failure by the different flows to reach the correct stoichiometric ratio during the first mixing and delivery step is prevented.

The reacting polymeric mixture, while flowing out of the mixing chamber 103 and then through the delivery duct 107, starts polymerizing and a gradual reduction of the mixing turbulence along the aforesaid duct 107 occurs.

A cohesive jet can outflow from the end of the delivery duct 107 if the loss of turbulence is sufficient otherwise there is still a jet affected by rotational motions and turbulence events.

It is desirable to have an outlet cohesive jet to ensure a correct process of foaming and filling the mould and to achieve a high quality of the obtained products.

The aforementioned cleaning and closure member, also called self-cleaning stem 111, hydraulically controlled and sliding along the delivery duct 107, acts controlled in sequence with the closure of the mixing slide valve to eject the reacting resin and keep the duct duly clean, scraping away the residues of resin of the delivery chamber and scraping away also the residues that have adhered to the front end of the slide valve 109 when the latter is completely advanced and in flush position with the inner surface of the delivery duct 107.

The self-cleaning stem 111 can have a cylindrical shape with constant diameter throughout its longitudinal extension (straight stem in FIG. 2), or have a cylindrical scraping head coupled with the delivery duct with reduced clearance, while the control stem portion has a section with smaller diameter compared to the diameter of the scraping head such that it does not slide with pressure contact on the thin layer of reacted resin that forms on the inner surface of the delivery duct (hammer-shaped stem with scraping head in FIG. 3).

It is important to ensure a high geometrical precision and very limited clearance in the couplings between the various components, for example between the slide valve 109 and the mixing chamber 103 and between the head of the self-cleaning stem (cleaning member) and the delivery duct 107. This aims at ensuring efficacy in scraping the residual resin away from surfaces wetted by the resin; the resin in fact, after each recirculation cycle, gradually accumulates in the form of a reacting adhering thin layer that polymerizes and hardens rapidly by bonding at the surfaces of the respective chambers.

The above described high-pressure mixing heads have the drawbacks and the limits hereinafter set forth.

In particular, problems relate to the three following factors: the bonding effect exerted by the reacted or reacting resins at the interface between the surfaces of fixed walls and the surfaces of the movable elements on which they stratify, the leakage of the resins (when still in the liquid step they are mixed or not yet mixed or in the reaction step) through the orifices or the clearance of the elements acting to separate and partition the resins thereof, and the wear affecting sealing elements during the operation, currently even more exacerbated by frequent cycles and high speeds.

In use, in the mixing head 100, thin layers, or thin films of reacted resins tend to form in the clearance gaps between the movable elements and the respective chambers where they slide, i.e. between the slide valve 109 and the mixing chamber 103, but in a more significant and continuous way, between the self-cleaning stem 111 and the delivery duct 107. Such thin layers of reacting resin, initially in the liquid state, polymerize rapidly in a few tens of seconds and after some hundreds of delivery cycles they form well adhering layers that have a high bonding capacity on the surfaces.

The layers of polymer resin tend to accumulate both on the movable members and on the walls of the chambers where they slide. This occurs rapidly and systematically for the self-cleaning duct, while, in the case of the mixing chamber, the event of accumulating and stratifying the reacted resin is contrasted and reduced by the washing effect performed both by the non-mixed resins sliding into the respective cavities during recirculation and by the leakage of non-mixed resins along clearances between slide valve and mixing chamber due to pressure differences and by the inlet of jets of reactive components at high speed and under pressure.

Referring in particular to the self-cleaning duct, problems do not occur as long as movable members are able, by their own movement, to remove such hardened resin from the surfaces taking away parts thereof in the form of rolls or plates or strands. The operation becomes more critical when such layers start accumulating on a side of the chambers overlaying one another: in this case the movement of the movable scraping members is no longer able to efficiently remove layers of resin polymerized homogeneously over all the circular extent of the surface but tends to compress the layers of resin that accumulate on a longitudinally-extending zone where they stratify more and more while the strong pressure causes the total scraping of the layer on the opposite side where the scraping part tends to slide with metal-on-metal contact on the surface of the duct. On both sides of the duct the strong pressure occurring during the sliding causes such compression and friction conditions that they generate a strong heating and then damage due to surface seizure in the metal contact zone.

The stratification phenomenon generally occurs on all the surfaces coupled with recirpocal movement but with very different effects depending on the duct submitted to the self-cleaning action which is taken into consideration. For example, the layer of resin which deposits on the walls of the mixing chamber 103 and on the cylinder surfaces of the slide valve 109 and slidingly coupled thereto, is mostly flushed by virtue of the effect of the recirculation of the resin occurring before and after each delivery cycle and by virtue of the passage of the front cylindrical section of the slide valve in front of injectors. As regards the slide valve 109, a layer of reacted resin forms that mainly affects the front part perpendicular to the longitudinal axis thereof, having a saddle-shaped geometrical conformation and facing the self-cleaning delivery duct 107. The formation of a layer of reacted resin affects very little the cylindrical surfaces of the slide valve 109 (slidingly coupled to the mixing chamber 103).

Generally, the layer of reacted resin forms on the cylindrical surfaces of the slide valve only after long interruptions during which the slide valve itself remains in the closed position. The resin layer is however removed during the working cycles by the flows of non-mixed resins which have a washing effect.

During the opening and closing movement of the slide valve 109, injectors 130 are very closed to the slide valve 109 and thereby the jets of resin, compressed in the interposed meatus, cause a sudden and rapid washing action.

Similarly, on the surface interposed between the recirculation slots 110 of the slide valve 109, the layer hardly forms and it is flushed due to the action of a small quantity of resin (usually polyol) which tends to flow towards the slots 110 of the isocyanate by virtue of the pressure difference between the two slots 110.

Therefore, the layer of polymerized resin rarely forms on the surfaces of the slide valve 109, while, on the walls of the mixing chamber 103, the layer forms only in the junction ravines or in recesses or gaps specifically obtained.

By contrast the layers of reacted resin that form both on the surfaces of the self-cleaning stem 111 and on the walls of the respective delivery chamber 107 are difficult to remove completely by the scraping action of the self-cleaning stem 111 during its sliding movement.

Sharp-corner fronts of the self-cleaning stem 111 cannot totally remove by scraping the layer of the reacted resin during the opening and closing sliding operations but they remove a part and press what remains thereof.

The surface layer or film is scraped-off by a combination of mechanical actions forming the scraping-off effect of the resin thickness encountering the corners of the self-cleaning head 111. The layer of resin is partly removed by a real shear action of the surface of resin reacted or being reacted, while a certain thickness—higher than the one of the clearance defined between the self-cleaning head 111 and the delivery chamber 107—is not sheared but it is first of all squashed by the passage of the self-cleaning head 107 and then removed in subsequent passages by compression and subsequent rolling together with the removal of flakes of the film of polymer compressed and dragged by the movement.

However, a layer or film of reacted resin remains in any case adherent to the surface of the self-cleaning delivery duct 107; such film, when it is still liquid, spreads along all the surface itself, but it tends to remain bonded thereto accumulating only in some areas that extend mainly longitudinally and only at some angular positions with respect to the radial extension.

The film of resin that remains adherent is strongly compressed, during the passage of the scraping head of the self-cleaning stem, and opposes to the scraping action as it adapts elasto-plastically such that a complete removal is avoided; at the same time, the developing compression force amplifies the force component due to the friction which opposes to the sliding of the self-cleaning head.

It was noted throughout various tests, and with greater evidence in applications with reacting resins that form stiff compounds (of both low and high density), when polymerised, that, when the "L-shaped" self-cleaning head 100 is operating, especially after some tens of thousands of self-cleaning cycles, resins start to form a thicker layer on a side of the delivery duct 107 and that such a layer exerts on the head of the self-cleaning member or stem 111 a strong push towards the opposite side. It is a phenomenon that tends to self-sustain and intensify more and more; in fact the gradual increase of the thickness of the reacted resin that forms on a side causes at the same time a similarly clear increase of the pressure that the self-cleaning stem 111 performs on the opposite side where the compression force developed is able to remove the resin both by means of the front sharp corner of the self-cleaning stem 111 and by scraping-off and subsequently rolling and/or detaching flakes of resin chips that are formed in the relative motion under strong friction and compression conditions.

In other words, on an inner longitudinal stripe of the self-cleaning stem 107 a strongly compressed film of resin forms occupying all the clearance between stem and duct while on the other opposite longitudinal surface the high pressure and rubbing conditions hinder the formation of a resin layer and a metal-on-metal contact occurs.

Such problem has been known for long and occurs in the operating life after some thousands of deliveries. However, the phenomenon is also very emphasized and clear when the configuration of the self-cleaning delivery chamber 107 is composed of two separate and joined pieces and thus has a geometrical stepped discontinuity at the junction between the head-body 100 and the part protruding with respect to the part 140 joined thereto of the delivery duct protruding from the head-body 102 or extension of the self-cleaning duct, as schematized in FIGS. 4, 5, 4A, 4B and 5A which show two possible constructive configurations currently adopted in the state of the art and several possible protruding conditions of the junction step.

The formation and configuration of the step depends on the tolerances and processing errors of the two parts if they are processed as separate and on the mutual sliding of the coupled parts caused by the strong and sudden heating generated by the friction of the passage of resins during the working cycles which can lead to a mutual displacement of the parts even when the joined parts are already processed in a mutually assembled configuration.

In particular, in FIG. 4 it is shown the junction step in a case wherein the two parts of the delivery duct, one being integral with the body-head 102 and the other being a distinct extension part 140A and fixed at the bottom by means of a centering element and screws, have the same nominal diameter, i.e. the hole in the head body has the same diameter as the hole present in the extension part (d1=d0).

In FIG. 5 instead it is shown another configuration of the junction step deriving from a constructive solution in which the extension part 140B is configured with an inner hole of the extension part with a diameter (d0) greater than the respective diameter (d1) of the hole in the head-body (d0>d1). This solution is adopted to ease the alignment during the assembly avoiding a possible interference with the corners of the sliding self-cleaning stem 111. However, a step necessarily forms which can also be centered with respect to the axis of the duct 107, but which is usually shifted both during the assembly of the two pieces and due to shearing caused by thermal stresses.

The presence of a small step or misalignment higher than 5 micrometres is sufficient to cause an uneven and preferential accumulation of resin in the largest section of the walls of the delivery duct 107.

Referring to FIG. 5A, the abnormal accumulation of foam can also depend on a tilt or lack of parallelism of the two joined parts (element 140 connected to the head body 102) that define the delivery duct; such a circumstance causes a different side pressure on the delivery duct surface when the self-cleaning head slides towards the lower part of the delivery duct where the reacting resin exits and emphasizes the accumulation of reacted foam on a side as previously described.

When the delivery duct is composed of two parts and has a step at the junction between them, the layer of reacted and compressed resin tends to accumulate in the area of the delivery duct where it is more likely to stratify, i.e. in the area overlooking the largest part of the step. Where the step has a greater protrusion thickness, a longitudinal stripe of accumulated resin layers tends to form on the cylindrical inner surface of the self-cleaning duct while, on the opposite side, the strong push given to the self-cleaning stem by the resin compressed at the opposite side leads the self-cleaning stem itself to completely scrape the resin away and to generate the metal-on-metal sliding. This phenomenon, which is as previously mentioned, self-sustaining, and the direct rubbing between the metal surfaces, as a result of the heat produced, unfortunately causes, undesired scratches and seizing. Already at the onset of first seized zones, the self-cleaning stem needs to significantly increase its strength to move along the delivery duct.

Such problem is extremely important as the damage of the surface of the delivery duct and self-cleaning stem due to seizing inevitably leads to the need to replace such an expensive and complex component as the mixing head, also causing economic disadvantages due to production interruption (necessary for the replacement operation) which lasts for not less than a few hours.

As it is impossible, or in any case extremely difficult to obtained delivery ducts with step-free zones, and with perfect axial alignment, due to too much expensive assembly accuracy requirements, the configuration of the delivery duct made of two joined pieces is the most commonly used on "L-shaped" mixing heads due to assembly rapidity and low constructive costs; however, the required presence of the aforesaid junction areas with inevitable resulting steps, as well as possible angular misalignments of axis with respect to holes, is the cause of the above discussed problems. This adds to the fact that very often, in the operating life of the mixing head, a mutual misalignment of the mutually joined parts occurs, and therefore, even if the junction initially has a step of irrelevant dimension, the step itself, as a consequence of the inevitable misalignment (due to thermal shock expansions and mechanical stresses) would assume dimensions no longer negligible with the resulting above discussed consequences.

In the light of the above, we can thus list in the following some of the limits and drawbacks associated to the above described mixing heads 100:
  impossibility to prevent—in the delivery duct—junction zones which inevitably lead to stepped zones that are responsible for, or at least that strongly promote the formation of uneven layers of hardened resin, which adhere in an axially asymmetrical way to the inner surface of the delivery duct; such layers cause seizure events that are detrimental for the self-cleaning stem and the delivery duct;
  difficulty in the assembly operation: in order to minimize the above-mentioned step zones, processing tolerances are sometimes very strict, and it is necessary to mutually align the various components with high precision, with an obvious increase in costs and time for assembling;
  the assembly costs and time are considerable not just when the self-cleaning head is being constructed but also during the operating life thereof, i.e. during the necessary periodical interventions for replacing components being damaged by seizure events (which are in any case unavoidable even with very strict working tolerances).

Many of the above described problems were successfully overcome by means of a self-cleaning head solution, operating brilliantly and disclosed in the patent EP2767376 of the same applicant.

In the above described and discussed mixing heads, unfortunately, it is not possible to foresee and prevent asymmetric layers formation of hardened resins, responsible for the onset of scratches and seizure where the contact metal-on-metal occurs along the self-cleaning duct; these phenomena submit mixing heads to conditions of severe wear during operation and inevitably force to replace the concerned pieces, composed in these cases of both head-body and extension of the self-cleaning duct, with obvious additional maintenance expenses and inevitable machine interruptions which are economically detrimental.

OBJECTS OF THE INVENTION

An object of the present invention is to provide a new improved solution, able to overcome all the drawbacks and problems previously set forth and also to make it possible to obtain further advantages.

In particular, an object of the present invention is to provide a solution that, in addition to reducing as much as possible the aforementioned damaging phenomena, thus sensibly elongating the operating life of the high-pressure mixing device, allows to constantly monitor the most critical working conditions which the mixing device or head is submitted to, particularly the self-cleaning delivery device, more precisely that allows to monitor the interaction forces between the cleaning member and the delivery duct making it possible to promptly detect anomalies related to bonding and scraping forces which can lead to critical operating conditions with the risk of slowdowns, exceeding localized heating, degradation of the self-cleaning function with the potential risk of damaging both the self-cleaning head and the surface of the delivery duct.

Another object of the invention is to provide a technical solution such as to simplify and make the construction of the device more cost-efficient, making it extremely more comfortable, rapid and cheap the coupling with the self-cleaning head with reduced clearance and with a precise geometry and the replacement of the only delivery duct and the self-cleaning member with no need to replace also the head-body.

In particular, an object is to provide an "L-shaped" high-pressure mixing device composed in such a way that it is extremely easy and rapid to assembly and replace, for extraordinary maintenance purposes of the delivery duct already coupled with the respective self-cleaning member with a suitable, even clearance and with a precise geometry with respect to the self-cleaning member. In particular, an object is to provide a construction solution provided with high levels of geometrical precision for the coupling of the delivery duct and the cleaning member, thanks to the higher size and geometrical precision offered by the new configuration of delivery duct made in a single piece. One further object is to provide a technical solution that allows to produce and house the delivery duct in the respective seat of the head body such as to ease both the axial and longitudinal centering and the angular orientation of the delivery duct with respect to the seat of the head body housing it and with respect to the cylindrical hole of the mixing chamber, easily compensating for possible working errors and size imprecisions.

A further object of the present invention is to provide a solution that still improves and makes the sealing action immediate, after installation, against leakages along the walls inside the hole housing the tubular element composing the delivery duct of both reacting mixture and lubricant liquid which it is often filled in with, fluxing it continuously by means of a pump dispenser, the spacer chamber separating the hydraulic control cylinder of the self-cleaning stem from the head body.

The spacer chamber is used to collect chips of reacted resin that the movement of the self-cleaning stem scrapes and transfers into the chamber itself when it moves in the opening towards it. The forced lubrication, when applied, removes said chips and further enters lubricant in the self-cleaning duct reducing friction, delaying the reaction of the film of resin and thus facilitating its operation for millions of cycles.

The input of lubricant liquid into the spacer chamber also inhibits the formation of reacted foam in the sections which couple the bushing with the head body and into the hole that extends the mixing chamber in the bushing. This additional problem is solved by the sealings provided in the instant patent.

A further object of the present invention is to provide a solution that further improves the sealing action against mixture leakage between the delivery duct and the head-body.

BRIEF DESCRIPTION OF THE INVENTION

The above can be obtained by means of a mixing device according to claim 1.

Thanks to the invention all the predefined objects are reached, in particular thanks to:
the delivery duct made in a single piece, thus obtained with a high dimensional and geometrical precision throughout its extension, having an even clearance with respect to the self-cleaning member and housed, with a reduced clearance, inside its own seat obtained in the head body,
the sealing and centering elements, which keep the clearance even and centered between the tubular element and its own seat in the head body and seal the meatus formed by the mutual clearance;
the sealing elements on the transversal hole (made on the tubular delivery element) that keep the front portion of the slide valve sealed and separated from the tubular delivery element thereof, and the sealing elements on the cap housed in the transversal hole placed diametrically opposed to the mixing chamber, in front of the slide valve, which seal and insulate the tubular element with respect to opposite part of the head body, reducing the mutual exchange of forces, and allow to transfer the load from the tubular element to the head-body substantially integrally through the annular shoulder zone.

Thanks to the presence of an annular cavity below the shoulder of the tubular delivery element, to which deformation-detecting elements are applied, it is possible to determine the conditions of deformation which the cavity containing the strain gauges is submitted to due to the friction, scraping and bonding forces exchanged with the cleaning member, and this allows to monitor constantly the most critical working conditions which the delivery and self-cleaning device of the mixing head are submitted to, in particular to monitor the interaction forces between the cleaning member and the delivery duct making it possible to promptly identify abnormalities related to the development of scraping forces that can lead to critical operating conditions with the risk of slowdowns, exceeding localized heating, degradation of the self-cleaning function with a possible risk of damaging and wearing and spoiling both the self-cleaning head and the surface of the delivery duct.

Thanks to the particular structural configuration of the mixing device according to the invention, advantages are obtained also from a constructive point of view; for example it is quicker to insert the delivery duct into the longitudinal hole passing through the head-body, in a perfectly longitudinally, transversally and also angularly aligned position, dramatically removing the complicated and time-consuming positioning operations and subsequent necessary processes to adjust possible misalignments at the interface between assembled parts.

BRIEF DESCRIPTION OF THE DRAWINGS

All the features of the mixing device according to the present invention will be more apparent from the following description, and from the enclosed drawings related to some embodiments.

FIG. 1A is a plan section view of the body of the "L-shaped" mixing head of the state of the art;

FIGS. 2 and 3 show two different types of self-cleaning stem provided inside a mixing head;

FIGS. 4 and 5 schematically show two different types of junction steps that can occur inside joined delivery ducts, more precisely at the junction interface between the head body and the elongated protrusion together defining the delivery duct;

FIGS. 4A and 4B show a known assembly configuration of the delivery duct respectively affected by one first incorrect non-centered positioning condition and by one second incorrect misalignment condition wherein the axis of the zone of the elongated protrusion is tilted;

FIG. 5A schematically shows the solution of FIGS. 4 and 5 but with a misalignment mistake with axis not parallel of the zone of the elongated protrusion, that can occur inside the joined delivery ducts of the state of the art;

FIG. 12 schematically shows a delivery duct according to the invention on which deformation-detecting sensors are provided according to a first variant;

FIG. 13 is an interrupted view of a part of the delivery duct of FIG. 12;

FIG. 14 shows a pair of deformation-detecting sensors, in particular two strain gauges arranged in a configuration for compensating for the thermal deformation;

FIG. 15 shows a connection diagram of strain gauges according to a first configuration with Wheatstone bridge circuit (half-bridge)

FIG. 16 schematically shows a delivery duct according to the invention on which deformation-detecting sensors are provided, arranged according to a second variant;

FIG. 17 is a top (plan) view of the delivery duct of FIG. 16;

FIGS. 18 and 19 are interrupted opposite side views of the upper end of the delivery duct of FIG. 16;

FIG. 20 shows a connection diagram of the strain gauges with Wheatstone bridge circuit (full bridge) according to a second configuration;

FIG. 21 schematically shows the delivery duct according to the invention on which deformation-detecting sensors are provided, arranged according to a third variant;

FIG. 22 is a top (plan) view of the delivery duct of FIG. 21;

FIG. 23 is an interrupted view of the upper end of the delivery duct of FIG. 21

FIG. 24 shows a connection diagram of the strain gauges with Wheatstone bridge circuit (half-bridge) according to a third configuration;

FIG. 25 schematically shows the delivery duct according to the invention on which deformation-detecting sensors are provided, arranged according to a fourth variant;

FIG. 26 is a top (plan) view of the delivery duct of FIG. 25;

FIGS. 27 and 28 are interrupted opposite side views of the upper end of the delivery duct of FIG. 25;

FIG. 29 shows the connection diagram of the strain gauges with Wheatstone bridge circuit (full bridge) according to a fourth configuration;

FIG. 30 shows an enlarged portion of a version of the device;

FIG. 30A is an enlarged detail of FIG. 30 and shows sealing and centering elements included in the mixing device according to the invention;

FIGS. 30B and 30C are schematic enlargements of the interface zone between delivery duct and mixing chamber, wherein a sealing element is well visible according to the invention respectively not in contact and in contact with a valve member;

FIGS. 31 and 32 show the behaviour of the sealing element and in particular the variation of its shape, with respect to the seat housing it, from an undeformed state to a working condition wherein the sealing element is inserted with interference in the aforesaid seat;

FIG. 39 shows a version of tubular delivery element according to the invention, having a transversal hole in which a seat is obtained, made by means of double interpolation of axis, configured for housing a saddle-shaped sealing element with constant section;

FIG. 40 is an enlarged detail of the hole with the sealing seat of FIG. 39;

FIG. 41 is a side view of the tubular element of FIG. 39:

FIG. 42 is a partially longitudinally sectioned view according to a sectional line XLII-XLII in FIG. 41;

FIG. 43 is an enlarged detail of FIG. 42 showing in section the transversal hole with the saddle-shaped sealing seat with constant section.

DETAILED DESCRIPTION OF THE INVENTION

Figure 1:
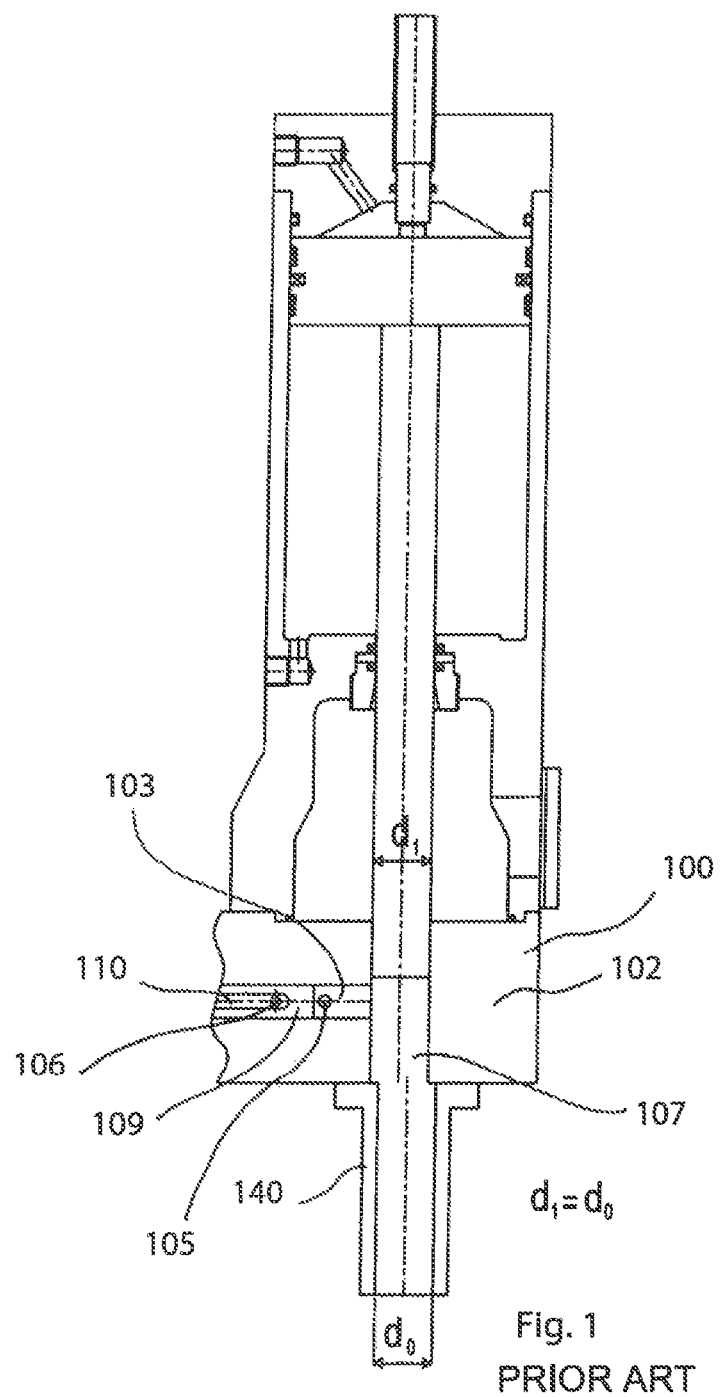
FIG. 1 shows an "L-shaped" mixing head of the state of the art.

Referring to the enclosed FIGS. 6 to 38, an "L-shaped" high-pressure mixing device 1 according to the invention is disclosed, configured to mutually mix two or more liquid components or reactive resins to form a reacting polymeric mixture intended to be poured or injected to produce various objects. Polyurethane, epoxy, vinyl ester, polyester, silicon and phenolic resins can be processed.

The mixing device 1 comprises a head-body 2 configured with a mixing chamber 3 having an inner cylindrical surface 4 provided with inlet openings or holes 5 and recirculation outlet openings or holes 6 for respectively inletting and recirculating liquid components or reactive resins; on the inlet holes 5 there are placed injectors that generate the jets of the two or more reactive resins transforming the pressure energy into kinetic energy of the jets.

Injectors can be placed opposite on to the other or with various angles that converge in a single focus point of the jets.

Injectors are composed of a nozzle and can comprise a partialization pin with settable position to generate suitable throttles of the fluid stream that generate the pressure upstream of the injector originating the high kinetic energy jets.

Inside the mixing chamber 3 it is housed a valve member 9, slidingly movable along the longitudinal axis of the chamber 3, and provided with recirculation longitudinal slots 10. The valve member 9 is slidingly movable in the mixing chamber 3 between a backward position, in which it clears the inlet openings 5 and the jets of the components, and an advanced position, in which each of the aforesaid recirculation longitudinal slots 10 puts in communication a respective inlet openings 5 and the jets of the components with a respective outlet and recirculation opening 6 for recirculating the respective reactive component towards the specific storage tank.

The mixing device 1 comprises a delivery duct 7, arranged transversally with respect to the mixing chamber 3, along which the reacting mixture flows once outflowed from the mixing chamber 3, to be for example ejected to a forming mould. In particular, the delivery duct 7 extends orthogonally with respect to the longitudinal extension of the mixing chamber 3.

The delivery duct is composed of a single tubular element 7, made in a single piece, having an open outlet end $E_a$ and an opposite open end $E_b$, at a spacer-chamber 18' disclosed hereinafter.

The tubular element 7, having sleeve revolution shape, is configured with an intermediate transversal hole 13 which, in an assembled configuration, is aligned apart from tolerance deviations, to the mixing chamber 3 and constitutes the extension of the mixing chamber up to the delivery duct. The transversal hole 13, which will be described more in detail in the following, is for putting the mixing chamber 3 in fluid communication with the delivery chamber which is defined inside the delivery duct 7.

The delivery duct 7 internally has a section with an area greater than the mixing chamber 3 one and extends such as to protrude at the bottom with respect to the head-body 2 and extends longitudinally between the axis of the mixing chamber and the outlet section $E_a$ equal to or higher than at least three-fold the diameter of the outflow chamber itself. This characteristic is for reducing the mixing turbulence and is such that the flow of delivered resin can also be laminar or cohesive. In particular it is useful that the delivery duct has a length extension at least more than four times its diameter.

The delivery duct 7 has a cylindrical inner surface 8 in fluid communication with the mixing chamber 3.

Thanks to the configuration in a single piece of the tubular element 7, as there are no junction zones, it is avoided the onset of any type of step or error of parallelism of the axis of the joined duct, which is typical of the known art systems, thereby preventing the uneven accumulation of resin in the delivery duct.

It is provided a cleaning member or stem 11 (self-cleaning stem) slidingly reciprocable inside such tubular element 7. The cleaning member or stem 11 has the function of ejecting, at the end of the delivery, the amount of mixture still contained in the tubular element 7 and to scrape away from the surface of the latter the adhered resin.

The delivery chamber and the relative self-cleaning stem have cylindrical shape and are mechanically coupled with a very precise and specific suitable clearance that can vary from 8 to 60 millimetres according to the dimension of the delivery section.

Scraping the resin away from the surfaces is obtained by means of the sliding of the self-cleaning stem 11 which can have a scraping length, i.e. a length of the cylindrical part that couples with a precise clearance with the inner diameter of the delivery chamber, reduced in length with respect to the extension of the chamber itself and which can have cavities or grooves or incisions of different shapes obtained on the surface that allow to seal, by means of sealing rings and/or accumulation of reacted resin, the cylindrical section itself with respect to the delivery chamber and concurrently reduce the surface on which they act the bonding force and surface friction that the resin, reacted or being reacted, operates between the self-cleaning stem 11 and the delivery chamber, internal to the delivery duct 7.

In the head-body 2, as well as in the delivery tubular element 7, in a position diametrically opposite and in front of the mixing chamber 3 (and of the transversal hole 13 of the tubular element 7 itself) an additional pass-through hole 52 is obtained which can be kept occupied and sealed by means of a cap 50 during the normal operation. The hole 52, having a service function, allows, once the cap 50 is removed, to apply to the head body an additional valve member for inletting washing or inerting liquids or gases. It is thus possible to wash for example a possible extension flexible duct of the delivery duct or it is possible to inject an inerting gas into the mould cavity wherein the reactive resin is injected.

Between the surface of the cap 50 and the second hole 52 a respective gap $I_{ii}$ is defined in which suitable elastic sealings 51 are interposed. The function of the gap $I_{ii}$ or clearance and of the relative sealings is to make it possible that the connection and engagement forces transmitted between the tubular element 7, the head-body 2 and the spacer chamber 18' are exchanged on the head-body 2 through the only annular shoulder zone 14.

The cap 50 is centered and guided into the hole of the head body, and housed with increased clearance in the hole obtained in the tubular element 7 with a clearance similar to that adopted for the hole of the spool. In order to ensure the mutual clearance between cap 50 and tubular element 7, it is possible to configure the corresponding hole obtained in the tubular element 7 with an increased diameter if compared to the diameter of the cap 50 itself. Alternatively, in a similar way, it is possible to configure the cap 50 with a reduction of diameter at the zone intended to penetrate in the thickness of the tubular element 7.

The sealings 51, particularly the one interposed between cap 50 and hole obtained in the tubular element 7, keep simultaneously sealed the hole penetrating into the thickness of the tubular element 7 and separated the part of cap 50 (penetrating into the thickness of the tubular element 7), namely not in metal contact, with respect to the surface of the housing cylindrical hole; this avoids the fact that a metal-on-metal contact coupling between the respective cylindrical surfaces transmit engagement forces between the tubular element 7 and the cap 50 itself. The centering coupling of the cap in the head body and the clearance or gap $I_{ii}$ towards the respective hole in the tubular element, while ensuring an efficient sealing against leakages of mixture towards the hole 52, leads to insulate the tubular element 7 with respect to the cap 50 and consequently with respect to the head-body 2, reducing the mutual exchange of forces, such that the load from the tubular element 7 is discharged to the head-body 2 substantially entirely through the annular shoulder zone 14.

To better operate, the cleaning member 11 can be constantly lubricated by means of a lubricant liquid that can be stationary or that can be forced to flow (by means of a pump), in the spacer-chamber 18' which is defined above the delivery duct 7 (between the hydraulic control of the self-cleaning stem and the head-body) and also between the delivery duct 7 itself and the stem portion with reduced diameter of the cleaning member 11, as it can be better seen in FIGS. 11, 11A, 37, 38.

Figure 11:
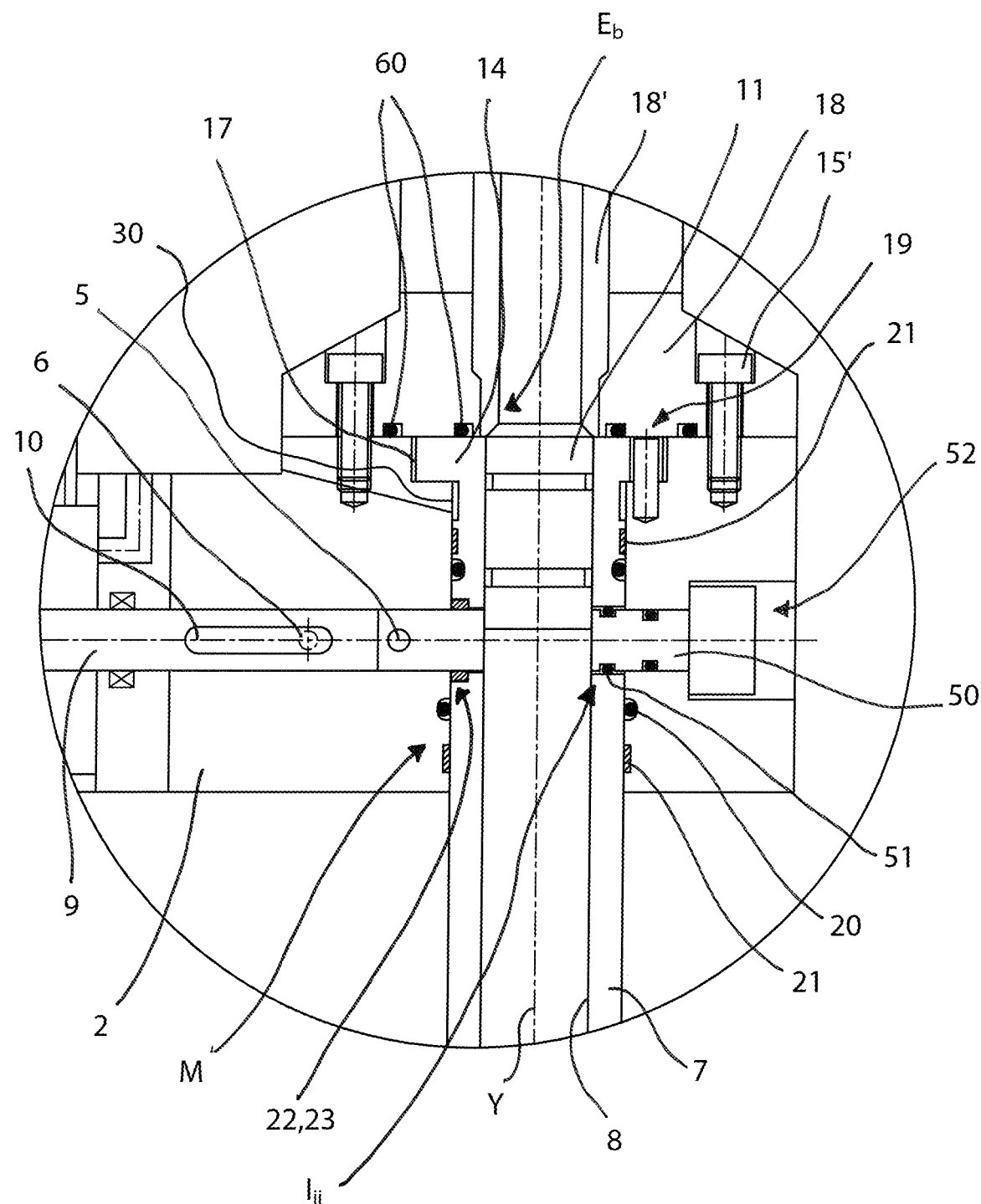
FIG. 11 is an enlarged detail of FIG. 10.
Figure 11A:
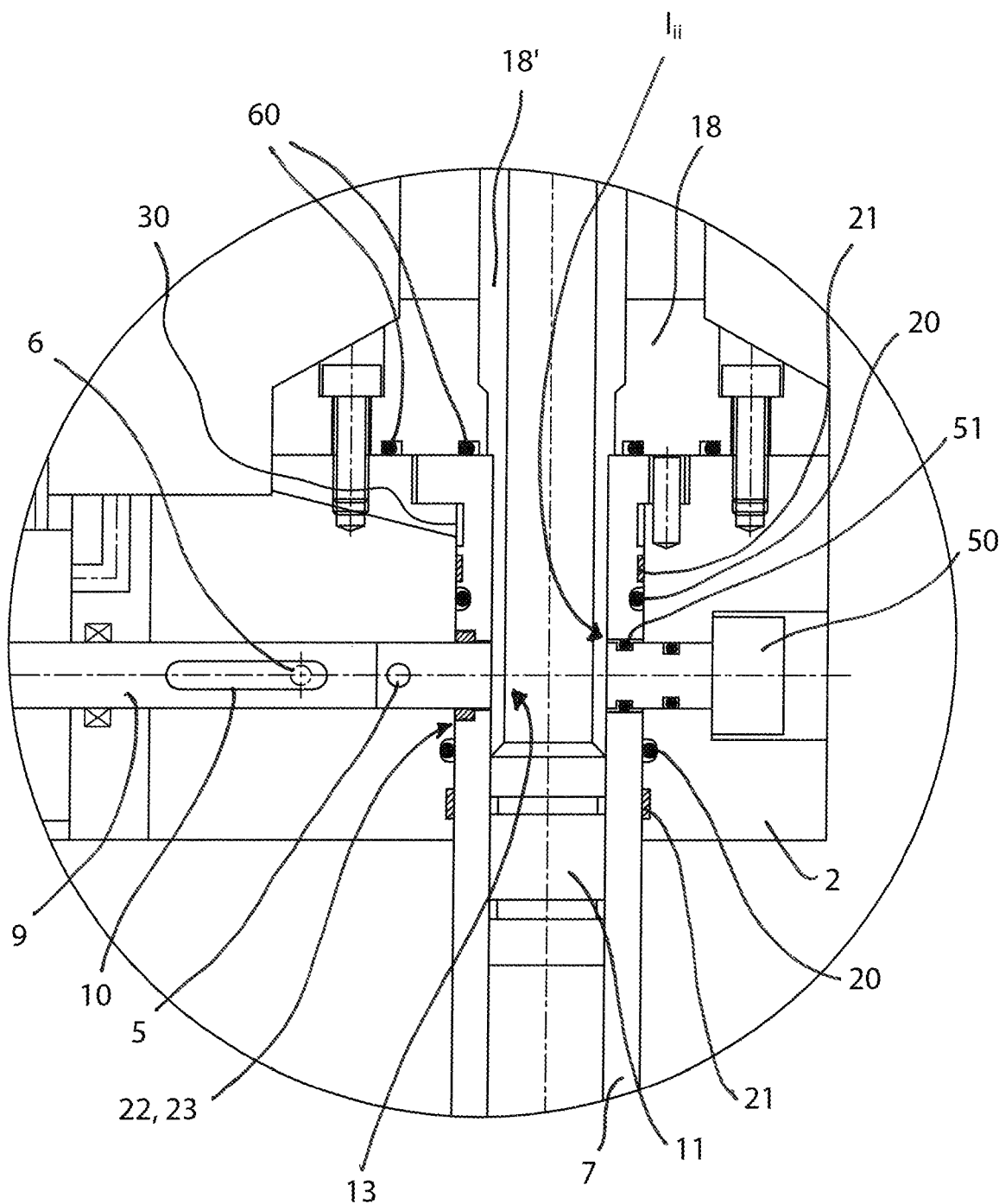
FIG. 11A is an enlarged detail as in FIG. 11 but showing the cleaning member head in lowered position.

In particular, in FIG. 11A it is shown the cleaning member head 11 in lowered position, over the intermediate transversal hole 13 of the tubular element 7.

The spacer chamber 18' is for collecting chips of reacted resin that the cleaning member 11 scrapes during its sliding and transports into the chamber 18' during the opening movement towards it. The forced lubrication, when applied, removes said chips and further enters lubricant into the delivery duct 7, reducing friction, delaying the reaction of the film of resin and thus facilitating its operation for millions of cycles.

However, such lubrication, when applied, has also the effect of inhibiting the formation of reacted foam in the coupling zones between the tubular element 7 and the head-body and in the transversal hole 12 that extends the mixing chamber 3, thus possibly promoting undesired leakages of lubricant during the first steps of use of the mixing device 1 (when a strong sealing action is not yet in place by the resin reacted in the various gaps). However, thanks to the specific configurations and arrangements of the sealing elements according to the invention described in the following, such risk of leakage of lubricant that would contaminate the reactive resins is successfully avoided. Precisely, any leakage of lubricant is efficiently avoided both in the interface between the delivery duct 7 and the head-body 2, and through the transversal hole 13 which constitutes an extension of the mixing chamber 3.

The following description mainly focuses on the tubular element 7.

The tubular element 7 can be removably inserted through a hole 12 transversal to the mixing chamber 3 and passing of the head-body 2, such that it extends longitudinally along all such hole 12 and transversally with respect to the mixing chamber 3.

The delivery duct (the tubular element 7) in a single piece and separate from the head-body 2 enables to process and refine with the necessary precision the self-cleaning stem (cleaning member 11) and the delivery duct itself regardless of the head-body 2, with the possibility to mutually couple them with the desired clearance and with the geometrical precisions originating from revolution processing (i.e. processing on tool machines that rotate the component to be treated), giving the possibility to make them interchangeable for the extraordinary maintenance of the parts when they are worn.

Different versions of structural configuration of the tubular element 7 are possible.

In particular, the tubular element 7 is configured with an annular shoulder zone 14 arranged at a zone distant from the transversal hole 13, for example arranged towards the delivery direction (at the bottom) or towards the spacer chamber (at the top) of the head-body 2.

Different modes for removably fixing the tubular element 7 are also provided. In particular, fixing elements (15; 15'; 16) will be described in the following that are configured for fixing rigidly though removably the annular shoulder zone 14 to a higher or lower surface of the head-body 2 to firmly lock the tubular element 7 in the transversal pass-through hole 12.

A clearance gap I is defined between the tubular element 7 and the transversal pass-through hole of the head-body 2. Such gap is configured both to enable to easily interchange the tubular element and to limit the contact area between the tubular element 7 and the head-body 2, such as to reduce the exchange of forces between the tubular element 7 and the surface of the transversal hole 12 and passing through in the head-body 2 and to transfer the load from the tubular element 7 to the head body 2 substantially entirely through the aforesaid annular shoulder zone 14. The clearance gap I is important for the correct operation of deformation-detecting elements (E1, E2, E3, E4) which the mixing device 1 is provided with, as described more in detail in the following The clearance gap I, in addition to insulating the tubular element 7 from the pass-through hole 12 of the head-body 2 to reduce the exchange of forces thereof, has the additional effect to enable to produce separately the tubular element and the self-cleaning stem which is coupled thereto with suitable, even clearance and precise geometry and also an easy operation for inserting and, if necessary, removing the tubular element 7 from such longitudinal pass-through hole 12.

The clearance gap I is shown and is well visible in FIGS. 30, 30A relative to one of the possible versions of the device 1. It is understood that such clearance gap is also present in all the other versions of device 1.

The clearance gap has a value that can vary from 12 to 80 micrometres according to the different diameters that depend on the head sizes concerned.

The device 1 is provided with sealing and centering elements M, comprising sealing annular elements 20 and annular centering bands 21, adapted to prevent the leakage of any liquid and suitable to keep the tubular element 7 in axially centered position with respect to the transversal pass-through hole 12 of the head-body 2. The centering elements comprise in particular bands 21 configured as cut rings or with centering overlaid segments adapted to avoid the direct contact between the respective cylindrical surfaces. They are positioned externally to the annular sealing elements 20 with respect to the position of the mixing chamber 3. The annular sealing elements 20 are positioned in circumferential cavities above and under the holes 13 and 52 transversal to the delivery duct so as to avoid the leakage of the polymeric mixture from the aforesaid gap towards the external side and towards the spacer chamber 18' and the leakage of the lubricant liquid (which does not hinder the operation of the centering rings) towards the mixing chamber 3 through the clearance I of the above described gap.

The annular centering bands 21 can be configured as overlaid annular segments or as elastic or elasto-plastic cut ring and are partially housed in respective annular seats obtained on the surface of the tubular element 7 and/or on the cylindrical surface of the longitudinal pass-through hole 12 of the head-body 2 in which the tubular element 7 is removably inserted.

The annular sealing elements 20 are housed in respective annular seats obtained on the surface of the tubular element 7 and/or on the cylindrical surface of the aforesaid longitudinal pass-through hole 12 and are placed near the transversal hole 13 that extends the mixing chamber 3 up to the delivery duct 7.

The annular centering bands 21 can be provided above the intermediate hole 13, beyond the annular sealing element towards the spacer chamber 18', i.e. at a height interposed between the upper end $E_b$ and the sealing annular element on top of the mixing chamber 3 and/or below the annular sealing element under the intermediate hole 13, i.e. at a height interposed between the lower end $E_a$ of the tubular element 7 and the annular sealing under the mixing chamber 3.

Similarly, annular sealing elements 20 can be provided directly above the intermediate hole 13 i.e. at a height interposed between the (upper) back end $E_b$ and the mixing chamber 3 and/or directly under the intermediate hole 13, i.e. at a height interposed between the front end $E_a$ and the mixing chamber 3.

Various possible versions of the high-pressure mixing device 1 will be described hereinafter, focusing the attention on the conformation of the tubular element 7 and its fixing configuration removable with respect to the head-body 2.

Figure 6:
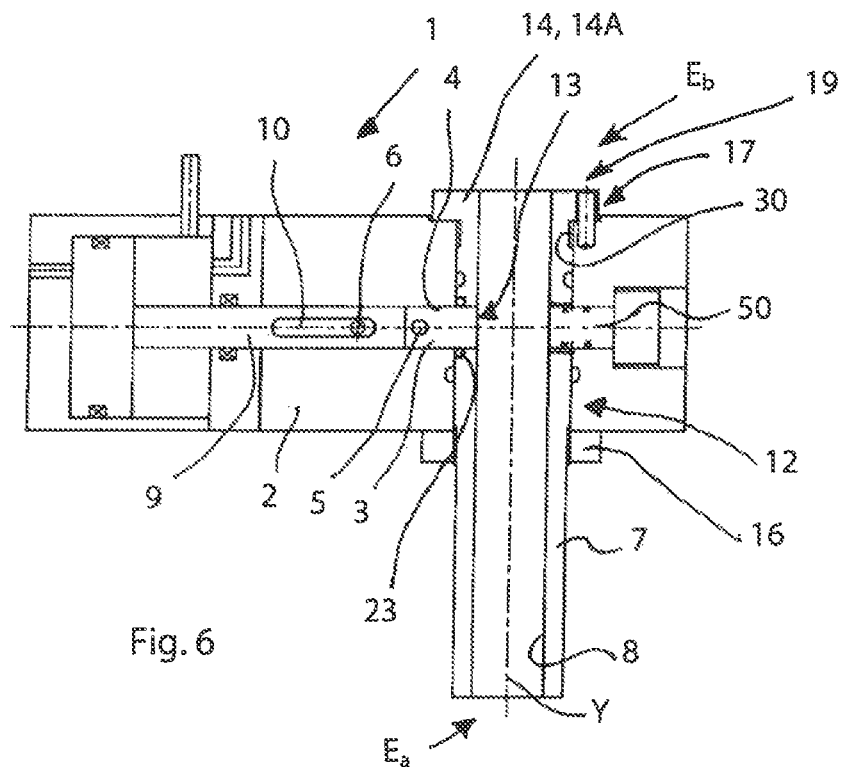
FIGS. 6, 7, 8, 9 show different configurations of delivery duct in the mixing device according to the invention.

According to the version shown in FIG. 6, the shoulder zone 14A, being annular- or flange shaped, is arranged at the upper end $E_b$ of the tubular element 7 laid on the spacer chamber 18' and it extends radially so that it can lay on the upper side surface of the head-body 2, in particular on a seat 17. The seat or counter bore 17 can be as deep as to house entirely the shoulder zone 14A, or so as to receive only a part thereof, the remaining part of the shoulder zone 14 remaining cantilevered upwards to be encompassed by an additional component (spacer).

In the version of FIG. 6, the fixing elements comprise a threaded annular element 16 configured to engage with a threaded surface obtained on a zone of the tubular element 7 at a position opposite to the shoulder zone 14A, with respect to the head-body 2, and arranged to lay with pressure on a lower surface of the head-body 2.

By screwing the annular element 16, the tubular element 7 is drawn and fastened downwards making sure that the shoulder portion or zone 14A abuts against the lower opposite surface of the base-body 2.

In this case the annular element 16 exerts a static pre-load force on the cavity 30 where deformation-sensitive elements are applied.

To ensure the correct angular position of the tubular element 7 in the pass-through hole 12, radial and angular centering elements 19 are provided. These centering elements can comprise a cavity 19 obtained in the shoulder portion or zone 14 and in the seat 17 arranged to receive the latter or two or more radial notches, obtained both on the tubular element 7 and on the head-body 2, into which pins or mutual centering keys or another equivalent mechanical abutment is inserted; such elements ensure the mutual correct positioning except for processing tolerances occurring both angularly and transversally to the longitudinal axis of the hole 12 itself.

For such coupling it is necessary that the distance of the axis of the transversal hole 13 (which serves as an extender of the mixing chamber 4) of the tubular element 7, measured in the longitudinal direction from the contact surface with the head body of the annular shoulder 14 of the tubular element 7 (delivery duct), is sufficiently precise but such as not to require special equipment or different from those of the mechanical processing made with modern tool machines.

Similarly, the precision of the notch radial positioning or radial centering notches must not require the use of special equipment or different from those of the mechanical processing made with modern tool machines, thus significantly facilitating the assembly operations and possible replacement.

Figure 7:
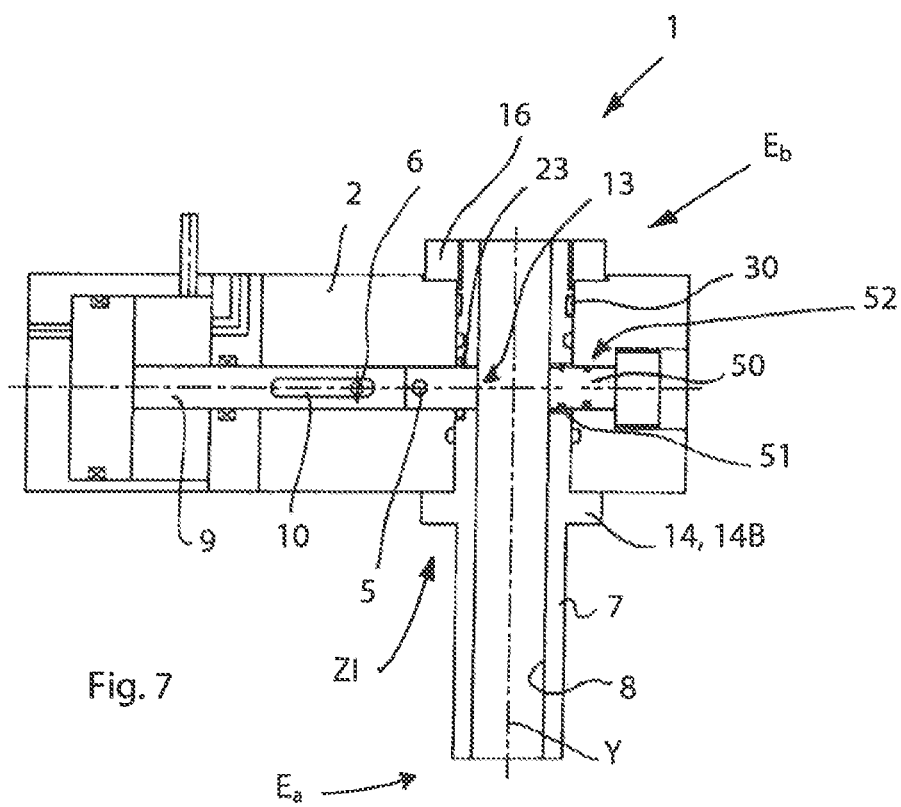

The version of FIG. 7 differs from the one just described in that the shoulder zone 14 and the annular element 16 have reversed positions.

In this case, the shoulder zone 14B extends, with an annular or flange shape, radially from an intermediate zone ZI of the tubular element 7 and it is configured to lay on the lower surface of the head-body 2 at an opposite position with respect to a higher (back) end $E_b$ of the tubular element 7. The annular element 16 can instead be screwed on a threaded zone at the upper end $E_b$ of the tubular element 7. For this version also, similarly to the previous one, a centering pin is provided on the lower flange.

Figure 8:
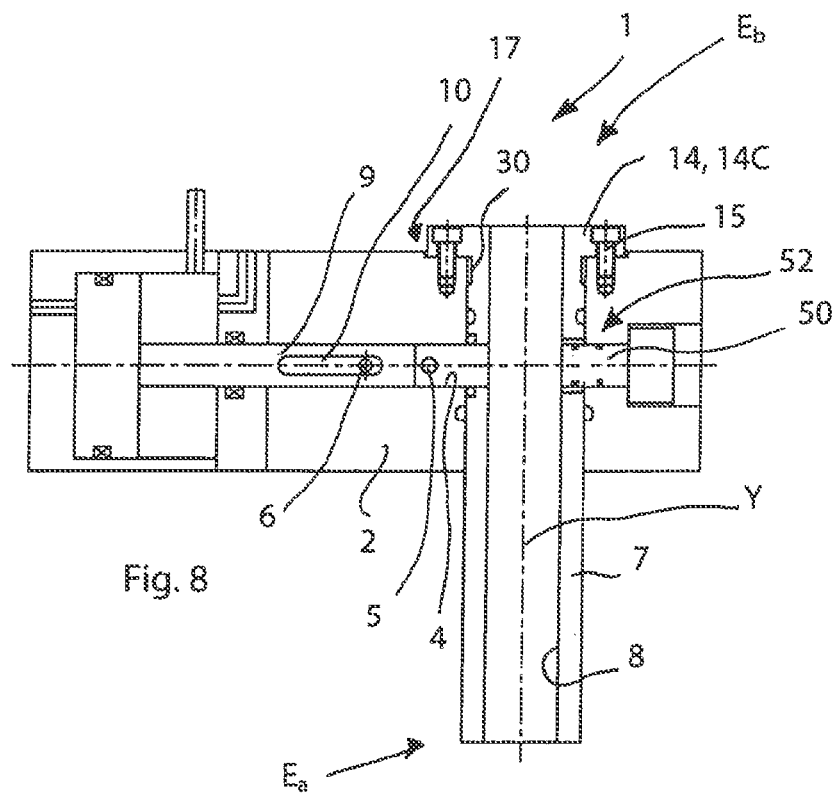

In the version of FIG. 8, the shoulder zone 14C extends from the upper end $E_b$ of the tubular element. The annular fixing element 16 is not present and the locking elements comprise specific screws 15 that are for tightening the shoulder zone 14C directly in the seat or counter bore 17 obtained on the head-body 2.

Figure 9:
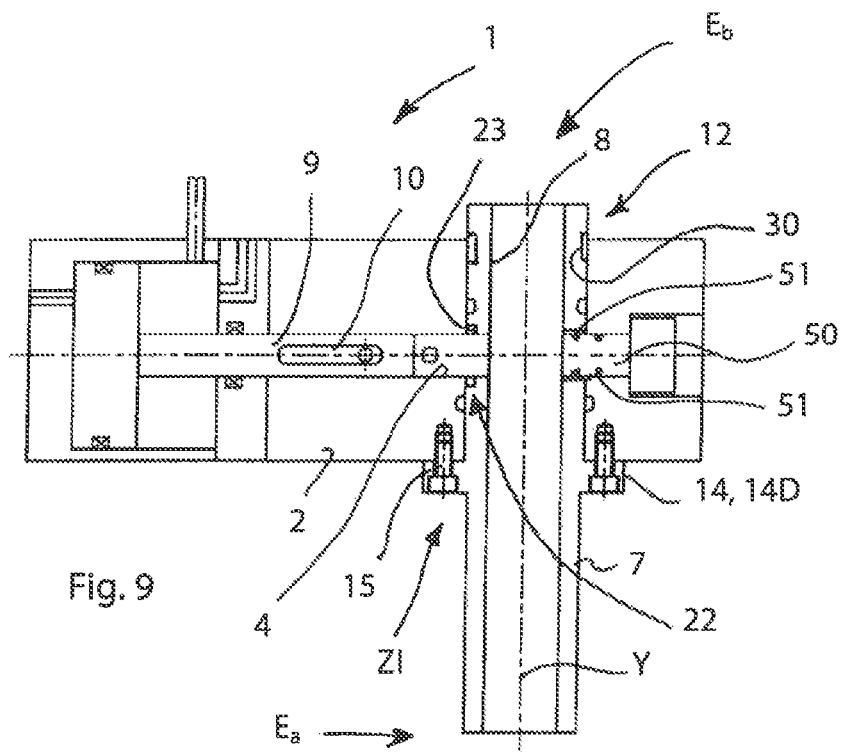

The version of FIG. 9 is similar to that of FIG. 8, but it differs in that it provides a shoulder zone 14D with locking screws 15 at the lower surface of the head body in the aforementioned intermediate zone ZI.

Figure 10:
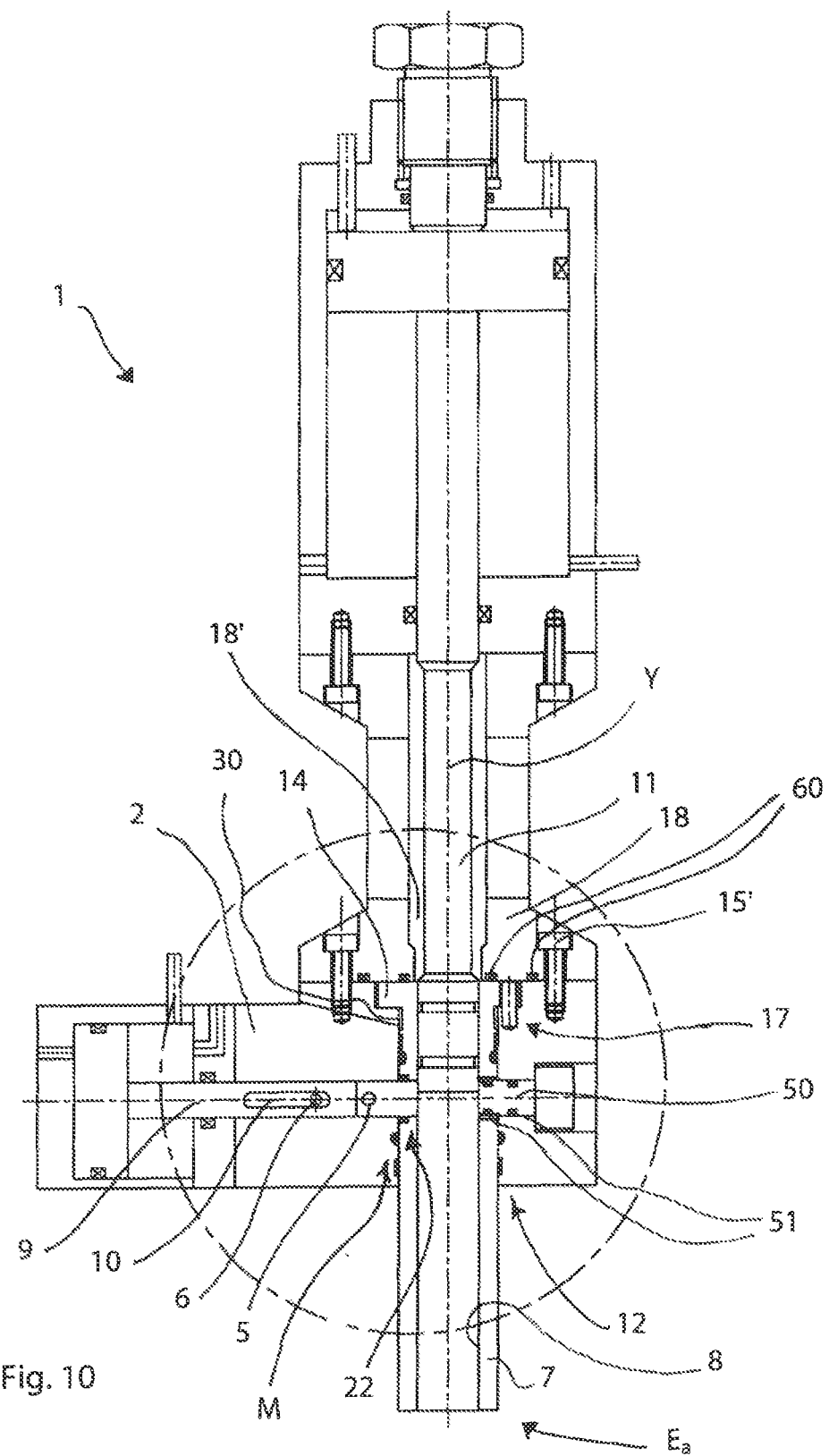
FIG. 10 is a longitudinal section view of one version of mixing device according to the invention.

FIG. 10 (and the enlargement view of FIG. 11) shows another possible version according to the invention. The shoulder zone 14 is housed in the seat 17 and protrudes therefrom for a few hundredths of millimetre. More precisely, the upper surface of the bushing protrudes upward with respect to the head body 2 for an amount between 3 and 9 hundredths of mm according to the size of the delivery tubular element 7.

The shoulder zone 14, thereby, is thus tightened with pressure between the head body 2 and a spacer chamber 18 also fixed to the control cylinder of the cleaning member or stem 11. In this case the locking elements comprise screw elements 15' arranged to fix the aforesaid spacer chamber 18 to the head body 2. The upper surface of the shoulder zone 14 is therefore slightly protruding from the surface of the head body 2 surrounding it and receives a tightening pressure by the elastically deformed spacer element 18. Suitable sealing gaskets 60 are provided interposed between the spacer element 18 and the head-body 2.

In another possible version, as already mentioned, the shoulder zone 14 is received in a seat 17 partially obtained on the head-body 2 and partially in the lower surface of the spacer chamber 18', or almost entirely obtained in the lower part of the spacer chamber 18.

Some exemplary versions of the deformation-detecting elements will now be described.

The deformation-detecting elements (E1, E2, E3, E4) which the mixing device 1 according to the invention is provided with, are in particular applied on the delivery tubular element 7.

As shown in FIGS. 12, 13, 16, 17, 18, 19, 21, 22, 23, 25, 26, 27, 28, there is obtained an annular groove (where deformation-detecting sensors are applied) in proximity to the annular shoulder 14 placed at its upper end $E_a$, towards the spacer chamber 18'; thereby the forces transmitted by friction, scraping and bonding by the movement of the self-cleaning head, can be detected, in the almost totality and extension of the movement, through the deformation of the inner cylindrical surface of said groove both when the self-cleaning head lowers to eject the reacting mixture and when it rises to open the delivery channel.

In particular, deformation-detecting elements comprise strain gauge sensors (E1, E2, E3, E4) of the resistance electrical type. Several possible versions of monitoring system comprising strain gauge sensors are set forth in the following.

FIGS. 12 and 13 schematically show the delivery tubular element 7 provided with strain gauge sensors arranged according to one first configuration inside the detecting cavity.

As it can be seen, on an outer cylindrical surface of the tubular element 7 an annular groove 30 is obtained in which two strain gauge sensors E1, E2 are applied.

The annular groove 30 extends with a depth in the thickness of said tubular element 7 such that the aforesaid strain gauge sensors are spaced apart and not interacting with the surface of the pass-through hole 12. The annular groove 30 extends circularly at the annular shoulder zone 14. However the possibility that such groove is obtained in other zones duly chosen on the tubular element 7 is not to be excluded.

According to the version of FIG. 12, in the groove 30 a first strain gauge sensor E1 is provided, having a grid structure whose long branches are mainly oriented parallelly to a longitudinal axis of the tubular element 7 (namely in the main direction of strain which the element 7 is submitted to), and a second strain gauge sensor E2, having a grid structure whose long branches are mainly oriented orthogonally with respect to such longitudinal axis Y which is mainly sensitive to thermal expansions in order to compensate for deformations of thermal origin. The schematic FIG. 14 shows more clearly the mutual arrangement of the two strain gauge sensors E1, E2.

Referring to FIG. 15, the first strain gauge sensor E1 and the second strain gauge sensor E2 are connected to define a half-bridge Wheatstone circuit in which there can be two external calibrated resistances R.

The aforesaid mutual position of the two strain gauge sensors E1, E2 and the connecting configuration ensure a precise detection of the deformation state of the tubular element 7 substantially along its longitudinal axis Y while deformation components due to thermal expansion are mutually eliminated.

It is provided a module 40 modulating, demodulating and amplifying the electrical signal coming from the Wheatstone bridge and a control unit Uc configured to detect the aforesaid electrical signal and store it as an operation condition of the tubular element 7 and cleaning member 11. In particular, based on the deformation extent to which the circular extension of the cavity 30 of the tubular element 7 is submitted, the control unit Uc determines a measurement of the friction, scraping and bonding forces exchanged between the tubular element 7 and the cleaning member 11 such as to monitor for each movement or for some specific movements the operating conditions of the self-cleaning and opening function of the delivery duct self-cleaning element system.

The control and command system of the high-pressure mixing device 1 is provided with a storage support wherein they are stored the values detected and digitalized of the electric strain gauge signal associated both to the step of interrupting delivery and controlling the closure-start i.e. of the movement of ejection of the mixture for a lapse of time, and to the step of controlling the opening-start i.e. the movement of returning upward to the upper part of the outlet of the mixing chamber until the end-of-stroke signal of the control piston enabling the opening of the mixing slide valve and the delivery of the mixture; stored values and their trend represent the operating conditions whereby friction, scraping and bonding forces exchanged between the cleaning member 11 and the tubular element 7 are indicative of possible degradation phenomena of the operating performances of such components.

The control unit Uc is configured to receive the amplified electrical signal, indicative of the strain affecting the circular cavity 30, and to register it digitally and make it proportional to the friction, scraping and bonding forces transmitted through the formed restricted portion of such cavity by means of suitable calibration coefficients and to store it based on time to perform a final and/or predictive diagnosis relative to the variation of such forces.

Referring to FIGS. 16 to 20, a second variant of the strain gauge detecting system is shown. Some components are similar to the previously described version and therefore have the same reference signals.

In this further second version, in a first zone of the annular groove 30 of the tubular element 7 a first strain gauge sensor E1 is applied, having an oriented grid structure with long branches extending parallelly to the longitudinal axis Y of said tubular element 7, and one second strain gauge sensor E2, having an oriented grid structure with long branches extending orthogonally with respect to such longitudinal axis (Y). In a second zone of the annular groove 30, diametrically opposed to the aforesaid first zone, a third strain gauge sensor E3 and a fourth strain gauge sensor E4 are applied; the third strain gauge sensor E3 is oriented as the first strain gauge sensor E1 while the fourth strain gauge sensor E4 is oriented as the second strain gauge sensor E2 respectively. In this case, the first E1, second E2, third E3 and fourth E4 strain gauge sensors are connected to define a complete full-bridge Wheatstone circuit where the strain gauges E2 and E4 have the function of compensating thermal deformations.

Referring to FIGS. 21 to 24, a third variant of the strain gauge monitoring system applied to the mixing device 1 is shown.

In this variant, in the cylindrical surface of the annular groove cavity 30 one first strain gauge sensor E1 is applied, whose grid structure is oriented with long branches oriented parallelly to the longitudinal axis Y of the deliver tubular element 7. On a transversal upper surface of the shoulder zone 14, laying orthogonally with respect to the longitudinal axis Y, a recess seat 31 is obtained wherein a second strain gauge sensor E2 is applied on an orthogonal plane with respect to the groove surface 30, i.e. orthogonal to the axis Y; hence it is not sensitive to load longitudinal deformations of the tubular element 7 while it is only sensitive to thermal deformations regardless of the direction of orientation of the grid structure lying on the aforesaid orthogonal plane. Thus, as the strain gauge sensor E2 is substantially sensitive only to thermal deformations, it can be applied according to any orientation on the aforesaid recess seat 31.

The first strain gauge sensor E1 and the second strain gauge sensor E2 are connected to define a half-bridge Wheatstone circuit including two external calibrated resistances R, according to the circuit diagram shown in FIG. 24.

The operation is similar to the previously described versions

Referring to FIGS. 25 to 29, it is shown a fourth variant of the strain gauge monitoring system applied to the mixing device 1.

Two strain gauge sensors E1, E3, whose grid structures are applied with specific glues with long branches oriented parallelly to the longitudinal axis of the tubular element 7, are applied in the annular groove 30 on the cylindrical surface at diametrically opposed positions. On the upper surface of the shoulder portion or zone 14, orthogonal to the longitudinal axis, two recess seats 31 are obtained that are diametrically opposed, in each of which a strain gauge sensor E2, E4 is applied where strain gauges E2 and E4 have the function to compensate thermal deformations.

Strain gauge sensors E1, E2, E3, E4 are connected to define a complete full-bridge Wheatstone circuit according to what shown in the diagram of FIG. 29.

Other positions and configurations for connecting strain gauges are possible according to specific needs for detecting deformations in particular points of the tubular element 7 or also of other parts of the mixing device 1.

From the above, it is obvious that strain gauges E1, E2, E3, E4 are all the more sensitive to variations of forces transmitted to the scraping head of the moving cleaning member 11 to the surface of the self-cleaning tubular element 7 (delivery duct) the more the tubular element 7 is separated from the direct contact with surfaces of the pass-through hole 12 of the head-body and from parts engaged thereto as the spool 9 and the cap 50, by means of elements (i.e. the annular centering bands 21 and the elastomer compressed sealings) that avoid the metal-on-metal direct contact that may transmit engagement forces. Thanks to the specific coupling configuration with clearance with the respective interposed sealing elements, an effective condition of separation of the tubular element 17 is ensured, which is necessary so that all the strength transmitted by the movement of the self-cleaning head is conveyed and discharged through the shoulder zone 14. The remaining part of the tubular element 7 can thus be object of accurate and sensible analysis of the deformation state generated during the movement of the cleaning member 11.

The risk of leakage of liquids (polymeric mixture and lubricant liquid) in the gaps described is in any case prevented thanks to sealing elements (20, 23, 51) specifically provided.

Now the interface zone between the mixing chamber 3 and the tubular element 7 will be described in more detail, taking into account that the characteristics set forth in the following must be considered present in all the above reported versions.

The intermediate transversal hole 13 obtained on the tubular element 7 (and extending the mixing chamber 3) has a diameter D1 greater than a second diameter D2 of the mixing chamber 3.

Thanks to this constructive feature, it is made sure that the diameter D1 of the transversal hole 13 is sufficiently increased compared to diameter D2 of the mixing chamber so as not to form protruding steps within the diameter D2 even when there are radial and longitudinal misalignments deriving from processing and coupling tolerances of the tubular element 7 with the head-body 2.

As a result, in the totally advanced closing position, the front end of the valve member 9 does not interfere with metal-on-metal contacts, and does not fasten the tubular element 7 which therefore remains separated and uncoupled from such valve member 9. This is done not to influence the detection of the stress and friction state which the tubular element 7 is submitted to during the interaction with the cleaning member 11 apart from weak and insignificant forces exchanged by means of the sealings 23, 51 applied along the thickness of the tubular element 7.

In other words, the front end of the valve member 9, during its movement towards the advanced position, can freely penetrate into the hole 13 until it slightly touches the surface thereof with no interference.

Such configuration makes it possible to avoid the onset of interference zones which would hinder the movement and damage the valve member 9 when it must be taken to the totally advanced position of closing and ejecting the reacting resin.

The greater diameter D1 (compared to D2) also implies a further effect.

Thanks to this configuration, it is possible to compensate for possible misalignments of mutual positioning between the mixing chamber 3 obtained in the head body 2 and the transversal hole 13 of the extension in the thickness of the tubular element 7 during the assembly and fastening operation.

As the valve member 9 is generally coupled in the mixing chamber 3 with a very reduced clearance (from about 5 to about 25 thousandths of millimetre), the greater diameter D1 of the transversal hole 13 makes it easy to mutually couple and position the latter with respect to the outlet section of the mixing chamber 3.

The transversal hole 13 is thus configured as an extension of the mixing chamber 3 and can internally receive the front end part of said valve member 9 in the advanced position.

The difference $I_i$ between the first diameter D1 e the second diameter D2 has a value between about 0.04 mm and about 0.3 mm. This difference of diameter thus facilitates assembly operations and avoids interferences in the discontinuity zone of the surfaces that might cause chips and seizure of the mixing slide member or valve or damage the sealing between surfaces and lead to leakages of resin or lubricants, such sealing being efficiently ensured also compensating for misalignments and differences in diameter by the particular sealing system set forth herein after.

Similarly, the diameter of the hole 52 is greater than the diameter of the cap 50 from 0.1 to 0.3 mm to avoid interferences of the cap with the inner diameter of said hole. The resulting respective gap $I_{ii}$ thus has a thickness up to 0.3 mm.

In the tubular element 7 an annular seat 22, 22A is obtained that is arranged coaxially to the aforesaid intermediate transversal hole 13 and it is configured to house an elastic or elasto-plastic sealing element 23 which is inserted with interference and which is adapted to elastically interact, with interference with the valve member 9 to perform an efficient sealing action.

This sealing system represents the most efficient alternative to the solution providing small circular cavities on the cylindrical front part of the slide valve 9 inserting a protruding resin-sealing which can however easily crack or wear on the corners of the aforesaid discontinuity surface and on the corners of the inlet holes of reactive resins.

It also represents an alternative to sealing with resin circular cavities obtained on the extension hole 13 of the mixing chamber 3 in the self-cleaning bushing delivery duct, resin-sealing which is made less stable due to the presence of lubricant in the delivery duct itself.

Considering these solutions, it is much simpler and more convenient to obtain, in accordance with the invention, the annular seat 22 on the extension hole 13 of the mixing chamber in the tubular element 7, housing therein the sealing element 23 made of elastomeric or elasto-plastic material.

The annular seat 22 and the elastic or elasto-plastic sealing element 23 can have different configurations.

According to an embodiment, the annular seat 22 can be obtained inside the thickness of the tubular element 7; in this case the annular seat 22 extends circularly with an even transversal section, i.e. having a toroidal shape and it contains laterally on both sides the elastic or elasto-plastic sealing element 23. An example of this configuration is shown in FIGS. 30, 30A, 30B, 30C, 31, 32.

In other cases, the annular seat 22 can be obtained by a counter bore on the external surface of the tubular element 7 and extends in the thickness of said tubular element 7 with an external saddle shape so as to be on a side open and faced both to the surface delimiting the transversal hole 13 obtained in the tubular element 7, and be faced to the surface of the pass-through hole 12 of the body-head 2, transversal to the mixing chamber, at the end section of the mixing chamber 3, as it is better shown in FIGS. 39 to 43. The elastic or elasto-plastic sealing element 23 is thus inserted with interference and compressed between the surface of the hole 12 transversal to the mixing chamber and the other surfaces that delimit the annular seat 22.

FIGS. 31 and 32 show the two different conditions of the sealing element 23 and in particular the change of shape thereof, compared to the seat 22 housing it, from an unshaped state (FIG. 31) to working condition wherein the sealing element is inserted with interference and is compressed in the aforesaid seat 22 (FIG. 32).

The sealing element 23 shown in FIG. 31 has a section characterized by only one cusp 27 addressed inward of the toroidal sealing and by two cusp zones 26 on the greater diameter external to the toroid with an intermediate recess zone in between the two cusps and two side tilted surfaces diverging inwardly of the toroid that form protruding corners. Cusps and corners, at forced contact with the surfaces of the annular seat 22, press against the surfaces of the annular seat 22 exerting a pressure ensuring the sealing action. The cusp 27 on the most internal diameter is intended to interact by squeezing while passing, with the cylindrical surface of the valve member 9 (slide valve). Cusp zones are defined by the intersection of surfaces having different lying positions, in particular surfaces having conicities opposite between them.

Figure 33:
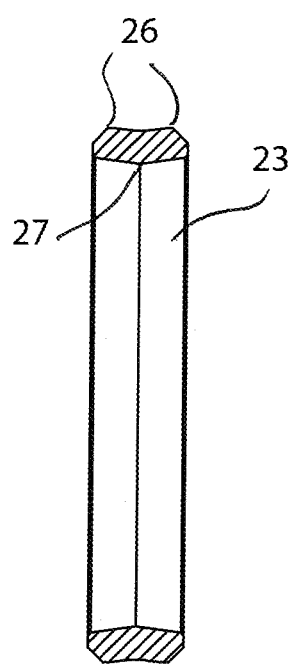
FIG. 33 is a section view of a version of sealing ring.

A similar conformation can be found in the element 23 shown in FIG. 33 which has a similarly toroidal extension.

In particular, the surfaces intended to interact with the valve member 9 have a tilted lying position such as to serve as an invitation for the valve member 9 itself.

Figure 34:
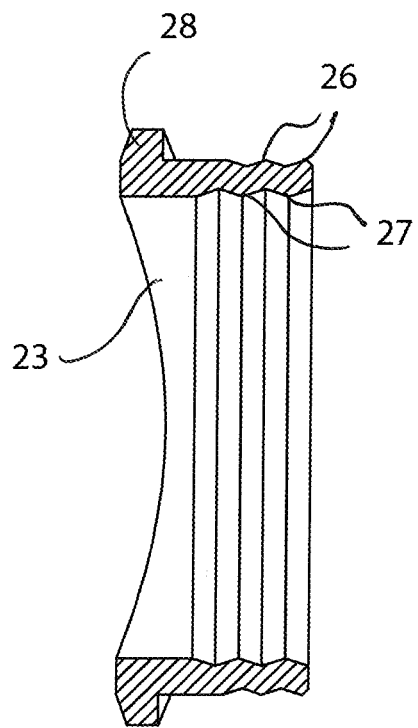
FIG. 34 is a section view of another version of sealing ring, being saddle-shaped.
Figure 35:
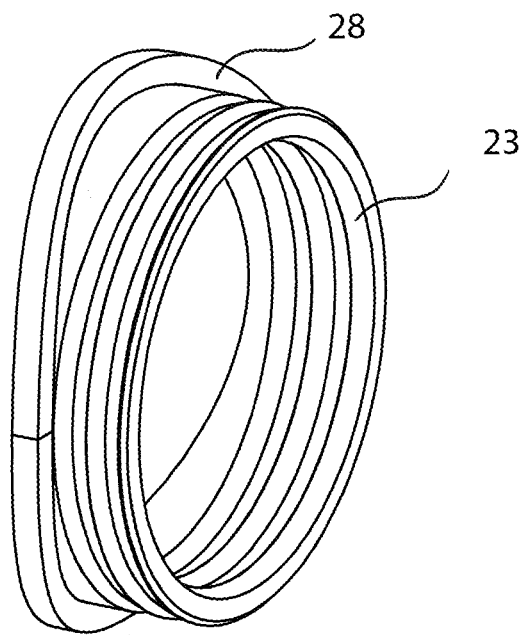
FIGS. 35 and 36 are perspective views of the sealing ring of FIG. 34.
Figure 36:
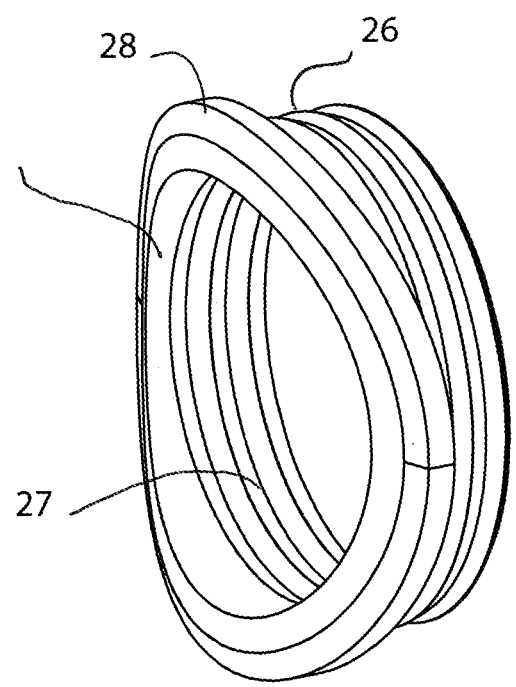
Figure 37:
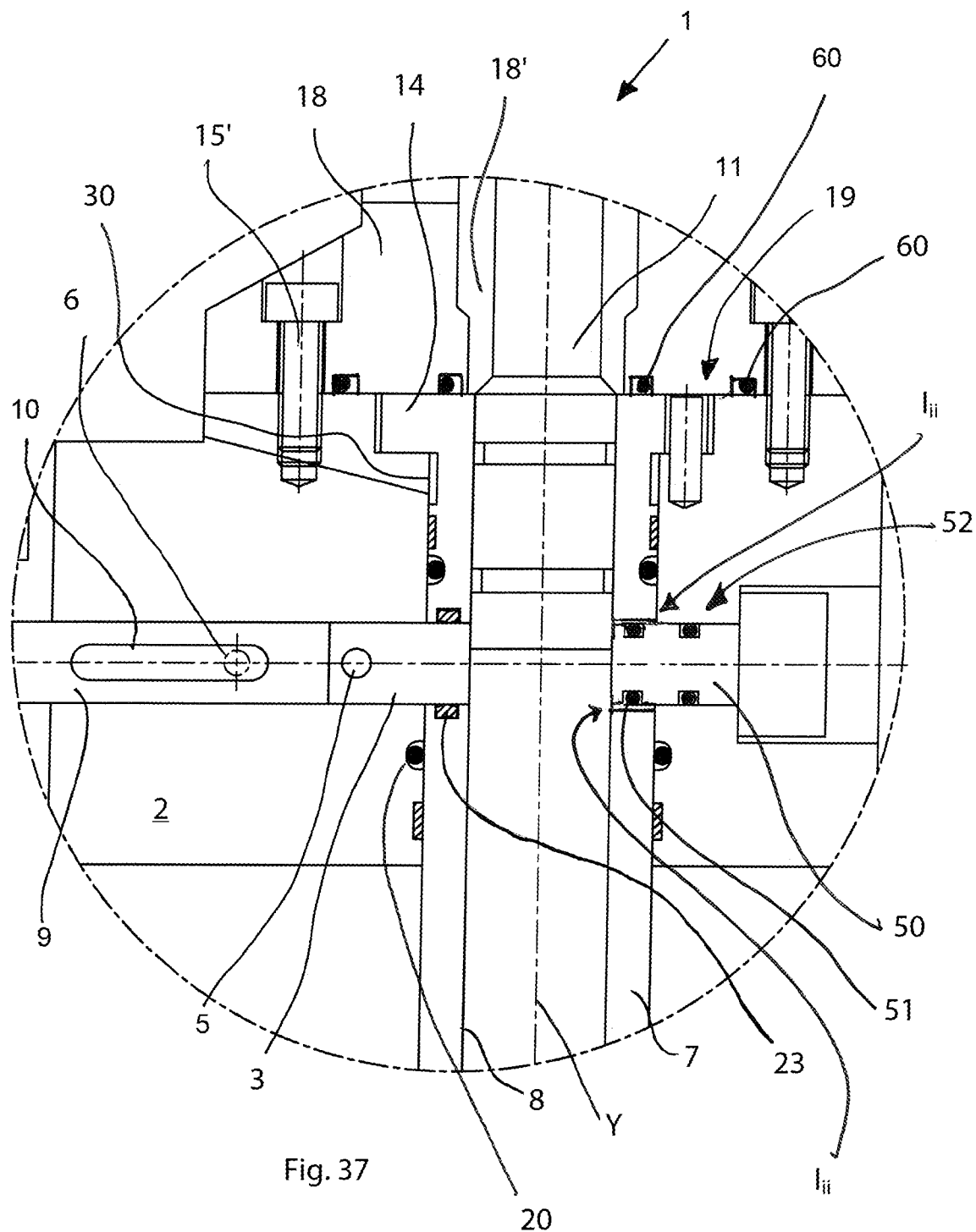
FIGS. 37 and 38 are schematic partial views of the mixing device according to two possible different versions of sealing element.
Figure 38:
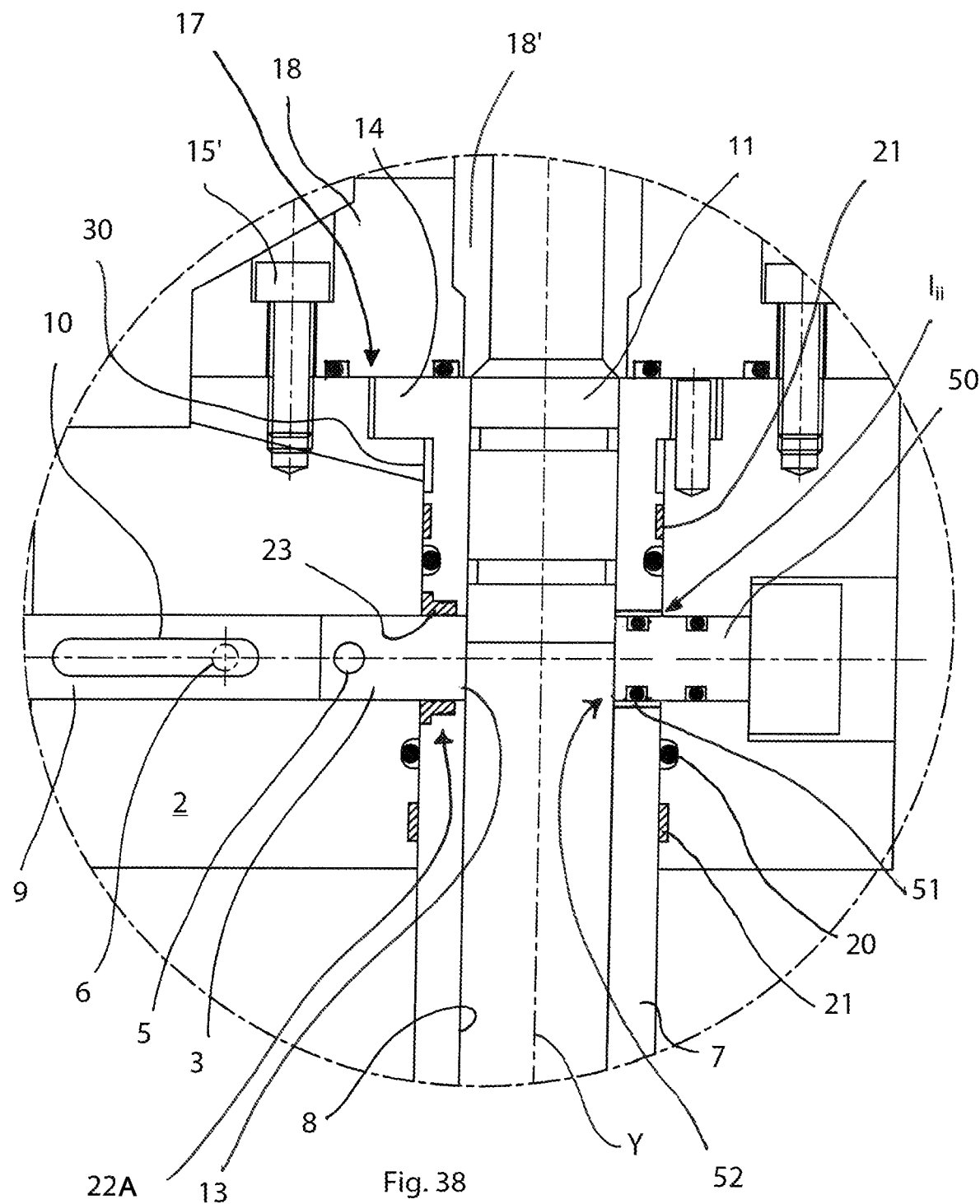

FIGS. 34, 35, 36 are respectively a section view and perspective views of the sealing element 23 in one of the possible "saddle" shaped configurations.

Cusp zones 26 have the effect of increasing the coupling action with the annular seat 22A compensating for possible dimension irregularities or surface roughness.

When the sealing element is forced into its seat, cusps 26 are compressed against the surfaces they couple with and they have the effect of increasing the specific pressure necessary for the sealing on the coupling surface with the annular seat 22A, adapting to possible dimension irregularities or surface roughness.

From the schematic FIG. 30B it is clear that the inner diameter D3 of the cusp zone 27 is smaller than the diameter D2 of the mixing chamber 3. Thereby, the sealing element 23 interacts elastically with interference with the valve member 9, ensures the hydraulic sealing against leakages of the reactive components and of lubricant avoiding the metal-on-metal contact of the valve element 9 with the surface D1 of the hole 13 transversal to the delivery duct.

Therefore cusp zones 27, which can have a bevelled cusp, act to perform an efficient sealing action on the cylindrical surface of the valve member 9 when the latter is in close proximity to its advanced position.

The sealing member 23 of the FIGS. 34 to 36, in addition to the "saddle" annular configuration, has the peculiarity of possessing a peripheral relief 28 extending radially according to the intersection of two orthogonal cylinders with diameters corresponding to the outer diameters of the projection whose seat is obtained in the outer thickness of the tubular element.

The peripheral relief 28 ensures a more efficient hydraulic sealing in open cavity in the coupling zone between the external surface of the tubular element 7 and the transversal hole 12 of the head-body 2. Substantially, the peripheral relief 28 enters the gap I between the tubular element 7 and the longitudinal hole 12 of the head-body 2.

As shown in FIGS. 39 to 43, it is also possible to provide a configuration of the seat 22 with constant section however having a "saddle" shape, in which a respective sealing element 23 with uniform section is housed. Such configuration of the seat 22, made for example on double interpolation numeric control machines, allows to make the sealing element 23 operating both at the interface between the transversal hole 13 and the slide valve 9 and at the interface between external surface of the tubular element 7 and surface of the housing pass-through hole 12 (of the head-body 2).

In summary, the sealing element 13, in different versions, of elastic or elasto-plastic material, is provided with lip portions with sharp or bevelled corners which ensure the sealing in the compressed state. The sealing action is in fact more reliable and efficient if carried out through an annular surface of reduced extension, duly compressed, which thus operates with high specific pressures and which adapts, by deformation, to roughness and geometrical errors of the surface on which the sealing must be carried out. Generally, the sealing element can have an outer surface with one or more cusp zones with sharp-corners or bevelled corners with triangle or trapezoidal transversal profile, or an inner surface with a cusp zone with triangle or trapezoidal profile, or an outer surface with four cusp zones with triangle or trapezoidal profile.

Generally speaking, thanks to the specific configurations of the sealing ring 23 and seat 22 in the above described various versions, it is possible to manufacture the tubular element 7 (sleeve) without precision construction restraints which would force to manufacture it as mechanically coupled with the head-body 2; it is thus possible to manufacture the two pieces separately and simply couple them by means of the various removable fixing solutions previously described (flange shoulder zone or portion, threaded ring, tightening by spacer 18, etcetera).

From what disclosed and shown in the enclosed drawings, it is clear that the mixing device 1 according to the invention successfully achieves all the predefined objects.

Thanks to the monitoring system with strain gauge sensors which the tubular element 7 (which forms the delivery duct in a single piece) of the mixing device 1 is provided with, it is possible to constantly monitor the force deriving from the friction, scraping and bonding of the self-cleaning head 11 when it moves (in the tubular element 7) which the tubular element 7 is submitted to; in particular the interaction between the surfaces of the cleaning member 11 and the surface of the delivery duct 7 is constantly monitored.

It is possible to monitor the strain affecting the circular cavity 30, to register digitally the signal proportional to friction, scraping and bonding forces transmitted through the formed reduced portion of such cavity by means of suitable calibration coefficients and to store it based on time to perform a final and/or predictive diagnosis relative to the variation of such forces.

Thanks to such monitoring system, it is possible to determine whether an extraordinary maintenance intervention is suitable or needed in order to verify the degradation/wear status of the tubular element 7 and cleaning member 11 and/or allow to clean and remove the layer of resin accumulated by stratification.

The use of a single-piece tubular element 7 as a delivery duct allows to sensibly lengthen the average operating life of the cleaning member 11 and delivery duct 7, and to overall improve the operating conditions of the entire device 1.

Furthermore, the following additional advantages are obtained. The peculiar structural configuration according to the invention, in addition to a significant reduction of the damaging phenomena and thus to a considerable lengthening of the operating life of the high-pressure mixing device 1, simplifies and makes it more cost-efficient to construct and assemble the device 1 itself and it also allows an easier, more rapid and cost-effective replacement of the delivery duct 7, also due to the coupling between the tubular element 7 and hole 12, between valve member 9 and hole 13, and between cap 50 and pass-through holes 52 providing respective clearance gaps I, $I_i$ and $I_{ii}$ and sealing and centering elements M (20, 21).

The dismantling and cleaning operation of the spacer 18 is also facilitated.

Thanks to the greater diameter of the transversal hole 13 in the tubular element 7, in synergy with the new sealing system given by the annular seat 22 and sealing element 23 described above, it is also extremely simple and quick to axially center and angularly orient the to delivery duct with respect to the seat of the head-body 2 housing it and with respect to the mixing chamber, easily compensating for the geometrical errors deriving from processing tolerances and possible geometrical errors and size inaccuracies.

In brief, the delivery duct 7 made in a single piece, the clearance gap I with the head-body 2, the centering and sealing elements 20, 21 and the greater diameter of the intermediate hole 13 compared to the diameter of the mixing chamber 3 and of the hole 52 compared to the diameter of the cap 50, in mutual synergy, allow to immediately insert the delivery duct 7 into the pass-through longitudinal hole 12 of the head-body 2, in a position that is longitudinally, transversally and also angularly aligned in a sufficient way such as to avoid interferences with the front of the movable valve member, dramatically removing laborious and time-consuming positioning operations and subsequent processing needed to compensate for possible misalignments and steps protruding at the interface between assembled parts.

It is possible to configure and shape the device 1, and parts thereof, as desired according to the applications it is intended for.

The materials, as long as they are compatible with the specific use they are intended for, can be properly selected according to the requested requirements and according to the available state of the art.

Variations and/or additions to what above described and illustrated in the enclosed drawings are possible, without departing from the claimed scope of protection.

The invention claimed is:

1. High-pressure mixing device suitable for forming a polymeric mixture resulting from one first and at least one second chemically reactive liquid component, said mixing device comprising:
   a head-body configured with a mixing chamber having inner cylindrical surface having inlet openings and outlet openings, respectively, for injecting and recirculating the reactive components;
   a delivery duct for releasing and ejecting the resulting polymeric mixture, having an inner cylindrical surface in fluid communication with said mixing chamber and inside which a cleaning member is slidingly movable that is adapted to eject the resulting polymeric mixture at an end of delivery and adapted to clean by scraping the inner surface of said delivery duct;

a valve member provided with longitudinal slots for recirculating separately the reactive liquid components and slidingly movable in said mixing chamber between a backward position, in which said valve member clears the front of said inlet openings, and advanced position, in which each of said longitudinal recirculating slots puts in communication one respective inlet opening with a respective outlet opening for recirculating the respective reactive component;

wherein said delivery duct is composed of a tubular element made in a single, not jointed, piece, having an open upper end communicating with a spacer chamber, and an open lower end for delivering the resulting polymeric mixture and, the cleaning member or stem reciprocable via hydraulic control along said tubular element between an upper backward position—in which the cleaning member or stem clears, at least partially, an outlet of said mixing chamber into a delivery chamber defined in said tubular element for enabling the outflow of the resulting polymeric mixture—and a lower advanced position in which the cleaning member or stem ejects the mixture still contained in said tubular element and scrapes away from the surface of said tubular element an adhered resin;

said tubular element being a piece distinct from, separated and processed separately from, said head-body and removably insertable into a pass-through hole of said head-body, transversal with respect to said mixing chamber, so as to protrude at a bottom longitudinally along the axis of said pass-through hole and transversally with respect to said mixing chamber;

wherein said tubular element is configured with an intermediate transversal hole placed, in an assembly configuration, so as to extend, with an increased diameter, said mixing chamber which thus extends up until it leads into them inner chamber of said tubular element;

on the surface that delimits said intermediate transversal hole an annular seat being formed and shaped to house an elastic or elasto-plastic sealing element, said elastic or elasto-plastic sealing element being housed with forced interference and compressed in said annular seat to exert a hydraulic function against leakages of reactive components from said longitudinal recirculating slots towards said tubular element and against leakage of lubricant liquid from the gap defined between a control stem of said cleaning member and said tubular element towards said longitudinal slots when an end front part of said valve member is in the advanced position;

said tubular element being configured with an annular shoulder zone placed at a zone distant from said intermediate transversal hole, and fixing and orienting elements being provided and configured for removably fixing said annular shoulder zone to a side surface of said head-body for locking in a correct position said tubular element in said pass-through hole, between said tubular element and said pass-through hole a clearance gap being defined configured both for allowing to easily interchange said tubular element and for limiting the contact area between said tubular element and said head-body, so as to reduce the exchange of forces between said tubular element and the surface of said pass-through hole in said head-body and transfer the load from said tubular element to said head-body substantially totally through the aforesaid annular shoulder zone, sealing and centering elements configured to maintain said tubular element in axially centred position and separated with respect to said pass-through hole of said head-body, avoiding metal-on-metal contact between respective cylindrical surfaces thereof, and configured to avoid leakages the polymeric mixture of the reactive components from said mixing chamber through said clearance gap and towards said spacer chamber and to avoid any leakage of lubricant liquid from said spacer chamber towards said mixing chamber through said clearance gap, further comprising deformation-detecting elements configured to detect deformation conditions which said tubular element is subjected to due to the friction, scraping and bonding forces exchanged between the cleaning member and the inner surface of said tubular element, so as to monitor working conditions of said mixing device.

2. High-pressure mixing device according to claim 1, wherein said annular shoulder zone extends radially at said upper end and said annular shoulder zone is tightened by or in contact with said spacer chamber.

3. High-pressure mixing device according to claim 1, wherein said annular seat is arranged coaxially with respect to said intermediate transversal hole for interacting with interference with said valve member, said annular seat having constant section completely contained in the thickness of said tubular element, without protruding on the outer cylindrical wall of said tubular element and having such a toroidal shape as to laterally contain at both sides said sealing element forcedly housed, or said annular seat being saddle-shaped or being a saddle-shaped annular counter bore, coupled or not coaxially with a counter bore with reduced diameter, said annular seat being on a side such that it is open and facing the surface that delimits said pass-through hole.

4. High-pressure mixing device according to claim 1, wherein said deformation-detecting elements are applied on specific surfaces obtained on said tubular element.

5. High-pressure mixing device according to claim 1, wherein said deformation-detecting elements comprise strain gauge sensors of the resistance electrical type.

6. High-pressure mixing device according to claim 5, wherein on an outer cylindrical surface and in the thickness of said tubular element an annular groove is obtained extending circularly at said annular shoulder zone, on which outer cylindrical surface there are applied a first said strain gauge sensor, having a grid structure with the long branches oriented parallelly to a longitudinal axis of said tubular element, and a second said strain gauge sensor, having a grid structure with the long branches oriented orthogonally with respect to said longitudinal axis, said first strain gauge sensor and said second strain gauge sensor being connected for defining a half-bridge Wheatstone circuit including two external calibrated resistances.

7. High-pressure mixing device according to claim 5, wherein on an outer cylindrical surface of said tubular element an annular groove is obtained extending circularly at the annular shoulder zone, in a first zone of the cylindrical surface of said annular groove being applied a first said strain gauge sensor, having a grid structure with the long branches oriented parallelly to a longitudinal axis of said tubular element, and a second said strain gauge sensor, having a grid structure with the long branches oriented orthogonally with respect to said longitudinal axis, in a second zone of the cylindrical surface of said annular groove, diametrically opposed to said first zone, one third strain gauge sensor and one fourth strain gauge sensor being applied, each oriented as said first strain gauge sensor and said second strain gauge sensor respectively, said first, second, third and fourth strain gauge sensors being connected for defining a full-bridge Wheatstone circuit.

8. High-pressure mixing device according to claim 5, wherein on an outer cylindrical surface of said tubular element an annular groove is obtained extending circularly at said annular shoulder zone, in which cylindrical surface a first said strain gauge sensor is applied, having a grid structure with long branches oriented parallelly to a longitudinal axis of said tubular element, and on a surface of said shoulder zone orthogonal to said longitudinal axis a recess seat is obtained on whose plane surface, orthogonal to said longitudinal axis, a second said strain gauge sensor is applied, that is sensitive only to thermal deformations, regardless of the direction of orientation of its grid structure, said first strain gauge sensor and said second strain gauge sensor being connected for defining a half-bridge Wheatstone circuit that includes two external calibrated resistances.

9. High-pressure mixing device according to claim 5, wherein on an outer cylindrical surface of said tubular element an annular groove is obtained extending circularly at said annular shoulder zone, on which cylindrical surface two diametrically opposed said strain gauge sensors are applied having grid structures with the long branches oriented parallelly to a longitudinal axis of said tubular element, and wherein on a surface of said shoulder zone, orthogonal to said longitudinal axis, two diametrically opposed recess seats are obtained, on each plane surface of which a said strain gauge sensor is applied, said strain gauge sensors being connected for defining a full-bridge Wheatstone circuit.

10. High-pressure mixing device according to claim 5, wherein an annular groove is obtained in the thickness of the tubular element with a depth of at least 20% of said thickness and in a position such that said strain gauge sensors are spaced apart and not interacting with the surface of the pass-through hole.

11. High-pressure mixing device according to claim 5, wherein said strain gauge sensors are arranged such that deformation components are eliminated due to thermal expansion, and wherein a modulator-amplifier of the variations of the electrical signal coming from a Wheatstone bridge defined with strain gauge resistances is provided, said modulator-amplifier being arranged to modulate and demodulate said electrical signal to reduce its interferences, being further provided a control unit on which the aforesaid electrical signal proportional to the sum of the friction can be stored, scraping and bonding forces exchanged between said tubular element and said cleaning member, said control unit being configured to allow mapping for each movement and to provide a comparison between a normal operating condition of the tubular element and of the cleaning member and an abnormal condition of operation thereof.

12. High-pressure mixing device according to claim 11, wherein a storage support is provided wherein values detected and digitalized of the electrical signal are stored associated both to a step of interrupting the delivery of the resulting polymeric mixture, of controlling a closure-start wherein a movement of ejection of the resulting polymeric mixture by the cleaning member is provided, and to a control step of an opening-start wherein the movement of returning of said cleaning member up towards the upper part of the outlet of the mixing chamber until an end-of-stroke signal of a control piston enabling the opening of said valve member and the delivery of the resulting polymeric mixture is provided, said stored values and their performance enabling to obtain and provide information on process parameters representing operating conditions wherein the friction, scraping and bonding forces exchanged between the cleaning member and the tubular element are indicative of possible degradation phenomena of the operating performances of such components.

13. High-pressure mixing device according to claim 12, further comprising a display and control panel through which an operator can view a variation of said values proportional to the friction, scraping and bonding forces detected through resistances of the strain gauge sensors as a function of time to perform a final and/or predictive diagnosis relative to the variations of such forces.

14. High-pressure mixing device according to according to claim 1, wherein said head-body and said delivery duct mutually extend according to an "L" configuration, wherein said delivery duct extends orthogonally with respect to a longitudinal extension of said mixing chamber and has an area section greater than that of the mixing chamber, and wherein said delivery duct extends such as to protrude with respect to the head-body and has a longitudinal extension, measured between the axis of said mixing chamber and the open lower end, equal to or higher than at least three times the diameter of the delivery duct itself, said longitudinal extension of said delivery duct being equal to at least three times a longitudinal dimension of said mixing chamber measured along an axis of said mixing chamber.

15. High-pressure mixing device according to claim 1, wherein said intermediate transversal hole has a first diameter greater than a second diameter of said mixing chamber such that the errors of longitudinal and radial alignment of the intermediate transversal hole transversal to the tubular element due to processing tolerance do not cause an interference with metal-on-metal contact of a front end of said valve member in the totally advanced closure position of said valve member with the walls of the intermediate transversal hole and such that the valve member does not exert locking actions on the tubular element which therefore remains separated and non-coupled from such valve member in order not to affect detecting a stress and friction state which said tubular element is submitted to while interacting with said cleaning member.

16. High-pressure mixing device according to claim 15, wherein said clearance gap has a clearance that can vary from 12 to 80 micrometres according to different diameters of the mixing chamber, and wherein the difference between said first diameter and said second diameter has a value that can vary between about 0.04 mm and 0.3 mm.

17. High-pressure mixing device according to claim 1, wherein said annular shoulder zone, having an annular or flange shape, is tightly locked between said head-body and said spacer chamber interposed between a control cylinder of said cleaning member and said head body, wherein said fixing elements comprise screw elements arranged to fix said spacer chamber to said head-body, and wherein said annular shoulder zone is received in a seat obtained on said head-body and/or on said spacer chamber.

18. High-pressure mixing device according to claim 17, wherein said seat is totally obtained on said head-body such as to house almost totally said shoulder zone leaving one of upper surfaces of said shoulder zone protruding at an outer end of said seat suitable for receiving a locking pressure performed by said screw elements against the upper surface of said head-body.

19. High-pressure mixing device according to claim 17, wherein said seat is partly obtained on said head-body and partly on the lower end of said spacer chamber such that said shoulder zone is partially housed in said head-body and protrudes therefrom to be partially contained in said spacer chamber, said shoulder zone resulting thus to straddle the interface surface between the head-body and said spacer chamber.

20. High-pressure mixing device according to claim 1, wherein said shoulder zone extends, with an annular or flange shape, radially from an intermediate zone of said tubular element and it is configured to lay on a surface of said head-body in a position opposite with respect to said upper end.

21. High-pressure mixing device according to claim 1, wherein said fixing elements comprise screw elements arranged to directly engage with said shoulder zone to removably fix said shoulder zone to said head-body.

22. High-pressure mixing device according to claim 1, wherein said fixing elements comprise a threaded annular element configured for engaging with a threaded surface obtained on a zone of said tubular element in a position opposite to said shoulder zone, and to lay on a surface of said head-body.

23. High-pressure mixing device according to claim 1, further comprising a cavity for radially centering said tubular element, said cavity being obtained in said shoulder zone and in the annular seat arranged to receive a radial centering pin.

24. High-pressure mixing device according to claim 1, wherein said sealing and centering elements respectively comprise sealing annular elements and centering annular bands between the pass-through hole of the head-body and the tubular element constituting the delivery duct.

25. High-pressure mixing device according to claim 24, wherein said centering annular bands are partially housed in respective annular seats obtained on the surface of said tubular element and/or on the cylindrical surface of said pass-through hole of said head-body.

26. High-pressure mixing device according to claim 24, wherein said sealing annular elements are housed in respective annular seats obtained on the surface of said tubular element and/or on the cylindrical surface of said pass-through hole of said head-body.

27. High-pressure mixing device according to claim 1, wherein in said intermediate transversal hole provided on said tubular element, said annular seat being an annular counter bore seat with constant section or annular concentric double counter bore seat arranged coaxially with said intermediate transversal hole on the outer surface of said tubular element, said annular seat extending saddle-shaped in the thickness of said tubular element such as to be, on a side, open and faced on the surface delimiting said pass-through hole of said head-body housing said tubular element, said elastic or elasto-plastic sealing element being suitable for interacting with interference with said valve member and being housed with interference between said longitudinal surface of the pass-through hole and the other surfaces of said annular seat shaped as a saddle or as a saddle followed by cylindrical counter bore.

28. High-pressure mixing device according to claim 1, wherein said elastic or elasto-plastic sealing element comprises on the outer surfaces thereof recess zones and relief zones, with one or two or four suitable triangle-shaped, triangle-bevelled or trapezoidal cusps configured to increase a specific pressure of contacting and coupling said annular seat and to increase hydraulic sealing action towards the surface of the pass-through hole of the head-body and hydraulic sealing action towards the surfaces of the cavity or cavities that house said elastic or elasto-plastic sealing element and hydraulic sealing action in the interaction with the cylindrical surface of the valve member, and wherein the external surface of said elastic or elasto-plastic sealing element comprises a transversal profile with one or two or four triangle- or trapezoidal-shaped cusps to increase a specific pressure on the surfaces of the cavity or cavities and better adapt by deformation to roughness and tolerances of the surface intended to receive said elastic or elasto-plastic sealing element.

29. High-pressure mixing device according to claim 1, wherein the external surface of said elastic or elasto-plastic sealing element comprises a saddle-shaped peripheral profile to ensure the sealing also in a coupling zone between the outer surface of said tubular element and said pass-through hole of said head-body.

30. High-pressure mixing device according to claim 1, wherein the shape of said elastic or elasto-plastic sealing element is annular with constant section to be inserted with interference into the respective annular seat having a toroidal or saddle shape.

31. High-pressure mixing device according to claim 1, wherein in said head-body in said tubular element, at a position diametrically opposed and in front of said mixing chamber and said intermediate transversal hole, one further pass-through hole is obtained, occupied and sealed, during normal operation, by a cap, said further pass-through hole enabling, once said cap is removed, to apply to the head body a further valve element for inletting washing or inerting liquids or gases in order to wash an optional flexible extension duct of the delivery duct or to inject an inert gas into the cavity of a mould in which the reacting resin is injected, between the surface of said cap and the surface of said further pass-through hole a respective gap being defined in which sealing elastic elements are interposed, said gap being provided such that no interference or a metal-on-metal contact occurs between the cap and the further pass-through hole due to deviations of longitudinal and radial alignment of the intermediate transversal hole transversal to the tubular element due to processing tolerances, and that connecting and engagement forces transmitted between said tubular element, the head-body and said spacer chamber are discharged on the head-body through only the annular shoulder zone, and wherein said sealing elastic elements are configured to avoid any leakage of mixture or lubricant liquid towards said further pass-through hole.

32. Method for manufacturing a high-pressure mixing device of a first and at least a second chemically-reactive liquid component, where it is provided to:
configure a delivery duct as a tubular element made in a single piece, having an open upper end and communicating with a spacer chamber and a lower end open for delivering a reactive mixture, and wherein said tubular element can be processed separately with respect to a head-body of said mixing device and is inserted with a clearance and removably locked—to allow an easy removal—in a pass-through hole in said head-body,
obtain on said tubular element, before inserting it into said head-body, an intermediate transversal hole intended, in an assembled configuration, to extend a mixing chamber of said head-body with an increased diameter to compensate for, while being assembled, errors of mutual geometrical positioning due to processing tolerances and avoid the presence of steps and zones interfering with the movement of a valve member slidingly movable in said mixing chamber, such that said mixing chamber extends up until it leads into a delivery chamber internally delimited within said tubular element;

obtain in a cylindrical surface of said intermediate transversal hole in the thickness of said tubular element an annular seat with an outer saddle-shaped profile, forcedly house and compress in said annular seat a sealing element of suitable shape to be inserted with interference towards all the surfaces of said seat, so as to exert the function of hydraulic sealing against leakages of reactive components from longitudinal recirculating slots of said valve member towards said delivery duct and against leakages of lubricant liquid from a gap—defined between the control stem of a cleaning member slidingly movable in said mixing chamber and said tubular element—towards said longitudinal recirculating slots when the front end part of said valve member is in an advanced position;

provide sealing and centering elements configured to maintain said tubular element in axially centered position and separated with respect to said pass-through hole of said head-body, avoiding metal-on-metal contact between respective cylindrical surfaces, provide sealing gasket elements configured to avoid any leakage of polymeric mixture and of reactive components from said mixing chamber towards the interface between said head-body and said tubular element and towards said spacer chamber and to avoid any leakage of lubricant liquid from said spacer chamber towards said mixing chamber, configure said tubular element with an annular shoulder zone placed at a zone distant from said intermediate transversal hole, and removably fix, via fixing elements, said annular shoulder zone to a side surface of said head-body configured for locking in the correct position said tubular element in said pass-through hole, apply strain gauge sensors of the resistance electrical type on an annular groove obtained on the outer cylindrical surface of said tubular element, or apply one or more strain gauge sensors on said annular groove and one or more strain gauge sensors on a recess seat obtained on a surface of said tubular element, orthogonal to the longitudinal axis of said tubular element.

33. Method for monitoring the working conditions of a high-pressure mixing device, said method comprising the steps of:

detecting an electrical signal generated by deformation-detecting elements applied on specific surfaces obtained on a tubular element of said high-pressure mixing device, comprising strain gauge sensors connected to define a half-bridge or full-bridge Wheatstone circuit applied to the specific surfaces such that deformation components are mutually eliminated due to thermal expansion, amplifying said electrical signal to obtain a value proportional to the forces transmitted to said tubular element by the friction, scraping and bonding actions during the sliding of a cleaning member with respect to the inner surface of said tubular element, storing said electrical signal proportional to the sum of the friction, scraping and bonding forces exchanged between the tubular element and the cleaning member and mapping for each sliding movement a comparison between a normal operating condition of the tubular element and the cleaning member and a possible onset of an abnormal condition of operation of the group defined by the tubular element and the cleaning member.

34. Method according to claim 33, comprising storing, on a storage support, values detected and digitalized of the electric signal associated both to a step of controlling a closure-start wherein a movement of ejection of a polymeric mixture by the cleaning member is provided, both to a step of controlling an opening-start of a delivery duct wherein the movement of returning of said cleaning member up towards the upper part of the outlet of a mixing chamber is provided until an end-of-stroke signal of a control piston enabling the opening of a valve member, slidingly movable in said mixing chamber, and the delivery of the mixture, obtaining from said stored values and a performance thereof information on process parameters representing operating conditions wherein the friction, scraping and bonding forces exchanged between the cleaning member and tubular element are indicative of possible degradation phenomena of the operating performances of such components.

* * * * *